(12) United States Patent
Lin et al.

(10) Patent No.: US 11,004,409 B2
(45) Date of Patent: *May 11, 2021

(54) DRIVING METHODS FOR COLOR DISPLAY DEVICE

(71) Applicant: E Ink California, LLC, Fremont, CA (US)

(72) Inventors: Craig Lin, Fremont, CA (US);
Jo-Cheng Huang, Taipei (TW);
Heng-Che Chen, New Taipei (TW);
Peter B. Laxton, Marshfield, MA (US);
Ming Wang, Fremont, CA (US);
Ping-Yueh Cheng, Taoyuan (TW);
HongMei Zang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,123

(22) Filed: May 17, 2019

(65) Prior Publication Data

US 2019/0272792 A1    Sep. 5, 2019

Related U.S. Application Data

(63) Continuation of application No. 14/507,737, filed on Oct. 6, 2014, now Pat. No. 10,339,876.
(Continued)

(51) Int. Cl.
*G09G 3/34* (2006.01)
*G09G 3/20* (2006.01)
*G02F 1/1675* (2019.01)

(52) U.S. Cl.
CPC ..... *G09G 3/344* (2013.01); *G02F 2001/1678* (2013.01); *G09G 3/2003* (2013.01);
(Continued)

(58) Field of Classification Search
CPC .... G09G 3/3444; G09G 3/2003; G09G 3/344; G09G 2300/0452; G09G 2310/068;
(Continued)

(56) References Cited

U.S. PATENT DOCUMENTS

| 4,143,947 A | 3/1979 | Aftergut et al. |
| 4,259,694 A | 3/1981 | Liao |

(Continued)

FOREIGN PATENT DOCUMENTS

| CN | 101009083 A | 8/2007 |
| CN | 101727224 A | 6/2010 |

(Continued)

OTHER PUBLICATIONS

Adam J. Pyonin, Patent Board Decision for U.S. Appl. No. 14/507,737, 2018, United States Patent and Trademark Office, (Year: 2018).*

(Continued)

*Primary Examiner* — Grant Sitta
(74) *Attorney, Agent, or Firm* — Brian D Bean

(57) ABSTRACT

The present invention is directed to driving methods for a color display device which can display high quality color states. The display device utilizes an electrophoretic fluid which comprises three types of pigment particles having different optical characteristics.

11 Claims, 28 Drawing Sheets

Related U.S. Application Data

(60) Provisional application No. 61/887,821, filed on Oct. 7, 2013, provisional application No. 61/925,055, filed on Jan. 8, 2014, provisional application No. 61/942,407, filed on Feb. 20, 2014, provisional application No. 61/979,464, filed on Apr. 14, 2014, provisional application No. 62/004,713, filed on May 29, 2014.

(52) U.S. Cl.
CPC ........... *G09G 2300/0452* (2013.01); *G09G 2310/068* (2013.01); *G09G 2320/0204* (2013.01); *G09G 2320/0242* (2013.01)

(58) Field of Classification Search
CPC .... G09G 2320/0204; G09G 2320/0242; G02F 2001/1678
See application file for complete search history.

(56) References Cited

U.S. PATENT DOCUMENTS

| | | |
|---|---|---|
| 4,443,108 A | 4/1984 | Webster |
| 4,568,975 A | 2/1986 | Harshbarger |
| 4,575,124 A | 3/1986 | Morrison |
| 4,947,159 A | 8/1990 | Di Santo et al. |
| 5,266,937 A | 11/1993 | DiSanto et al. |
| 5,298,993 A | 3/1994 | Edgar et al. |
| 5,754,584 A | 5/1998 | Durrant et al. |
| 5,831,697 A | 11/1998 | Evanicky et al. |
| 5,923,315 A | 7/1999 | Ueda et al. |
| 5,926,617 A | 7/1999 | Ohara et al. |
| 5,930,026 A | 7/1999 | Jacobson et al. |
| 6,005,890 A | 12/1999 | Clow et al. |
| 6,045,756 A | 4/2000 | Carr et al. |
| 6,069,971 A | 5/2000 | Kanno et al. |
| 6,075,506 A | 6/2000 | Bonnett et al. |
| 6,111,248 A | 8/2000 | Melendez et al. |
| 6,154,309 A | 11/2000 | Otani et al. |
| 6,219,014 B1 | 4/2001 | Havel |
| 6,445,489 B1 | 9/2002 | Jacobson et al. |
| 6,473,072 B1 | 10/2002 | Comiskey et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,532,008 B1 | 3/2003 | Guralnick |
| 6,639,580 B1 | 10/2003 | Kishi et al. |
| 6,650,462 B2 | 11/2003 | Katase |
| 6,657,612 B2 | 12/2003 | Machida et al. |
| 6,671,081 B2 | 12/2003 | Kawai |
| 6,674,561 B2 | 1/2004 | Ohnishi et al. |
| 6,686,953 B1 | 2/2004 | Holmes |
| 6,753,844 B2 | 6/2004 | Machida et al. |
| 6,753,999 B2 | 6/2004 | Zehner et al. |
| 6,760,059 B2 | 7/2004 | Ham |
| 6,796,698 B2 | 9/2004 | Sommers et al. |
| 6,825,970 B2 | 11/2004 | Goenaga et al. |
| 6,900,851 B2 | 5/2005 | Morrison et al. |
| 6,903,716 B2 | 6/2005 | Kawabe et al. |
| 6,914,713 B2 | 7/2005 | Chung et al. |
| 6,927,755 B2 | 8/2005 | Chang |
| 6,930,818 B1 | 8/2005 | Liang et al. |
| 6,970,155 B2 | 11/2005 | Cabrera |
| 6,982,178 B2 | 1/2006 | LeCain et al. |
| 6,987,503 B2 | 1/2006 | Inoue |
| 6,995,550 B2 | 2/2006 | Jacobson et al. |
| 7,006,130 B2 | 2/2006 | Harshbarger, Jr. et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,046,228 B2 | 5/2006 | Liang et al. |
| 7,057,600 B2 | 6/2006 | Goden |
| 7,061,166 B2 | 6/2006 | Kuniyasu |
| 7,061,662 B2 | 6/2006 | Chung et al. |
| 7,116,466 B2 | 10/2006 | Whitesides et al. |
| 7,119,772 B2 | 10/2006 | Amundson et al. |
| 7,126,577 B2 | 10/2006 | Zhou et al. |
| 7,177,066 B2 | 2/2007 | Chung et al. |
| 7,184,196 B2 | 2/2007 | Ukigaya |
| 7,193,625 B2 | 3/2007 | Danner et al. |
| 7,202,847 B2 | 4/2007 | Gates |
| 7,242,514 B2 | 7/2007 | Chung et al. |
| 7,259,744 B2 | 8/2007 | Arango et al. |
| 7,277,074 B2 | 10/2007 | Shih |
| 7,283,119 B2 | 10/2007 | Kishi |
| 7,298,543 B1 | 11/2007 | Tam et al. |
| 7,304,787 B2 | 12/2007 | Whitesides et al. |
| 7,307,779 B1 | 12/2007 | Cernasov |
| 7,312,794 B2 | 12/2007 | Zehner et al. |
| 7,327,511 B2 | 2/2008 | Whitesides et al. |
| 7,349,146 B1 | 3/2008 | Douglass et al. |
| 7,349,147 B2 | 3/2008 | Chopra et al. |
| 7,355,784 B2 | 4/2008 | Kim |
| 7,397,289 B2 | 7/2008 | Kojima |
| 7,408,699 B2 | 8/2008 | Wang et al. |
| 7,443,466 B2 | 10/2008 | Dedene et al. |
| 7,446,749 B2 | 11/2008 | Lee et al. |
| 7,453,445 B2 | 11/2008 | Amundson |
| 7,492,339 B2 | 2/2009 | Amundson |
| 7,495,651 B2 | 2/2009 | Zhou et al. |
| 7,504,050 B2 | 3/2009 | Weng et al. |
| 7,528,822 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,607,106 B2 | 10/2009 | Ernst et al. |
| 7,609,435 B2 | 10/2009 | Moriyama et al. |
| 7,612,760 B2 | 11/2009 | Kawai |
| 7,639,849 B2 | 12/2009 | Kimpe et al. |
| 7,679,599 B2 | 3/2010 | Kawai |
| 7,679,813 B2 | 3/2010 | Liang et al. |
| 7,683,606 B2 | 3/2010 | Kang et al. |
| 7,688,297 B2 | 3/2010 | Zehner et al. |
| 7,701,423 B2 | 4/2010 | Suwabe et al. |
| 7,701,436 B2 | 4/2010 | Miyasaka |
| 7,705,823 B2 | 4/2010 | Nihei et al. |
| 7,710,376 B2 | 5/2010 | Edo et al. |
| 7,719,755 B2 | 5/2010 | Kanbe |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,773,069 B2 | 8/2010 | Miyasaka et al. |
| 7,786,974 B2 | 8/2010 | Zhou et al. |
| 7,787,169 B2 | 8/2010 | Abramson et al. |
| 7,791,717 B2 | 9/2010 | Cao et al. |
| 7,792,398 B2 | 9/2010 | Tanaka et al. |
| 7,800,580 B2 | 9/2010 | Johnson et al. |
| 7,804,483 B2 | 9/2010 | Zhou et al. |
| 7,816,440 B2 | 10/2010 | Matsui |
| 7,839,381 B2 | 11/2010 | Zhou et al. |
| 7,848,009 B2 | 12/2010 | Machida et al. |
| 7,859,742 B1 | 12/2010 | Chiu et al. |
| 7,868,874 B2 | 1/2011 | Reynolds |
| 7,911,444 B2 | 3/2011 | Yee |
| 7,952,557 B2 | 5/2011 | Amundson et al. |
| 7,952,558 B2 | 5/2011 | Yang et al. |
| 7,956,841 B2 | 6/2011 | Albert et al. |
| 7,982,479 B2 | 7/2011 | Wang et al. |
| 7,995,029 B2 | 8/2011 | Johnson |
| 7,999,787 B2 | 8/2011 | Amundson et al. |
| 8,009,348 B2 | 8/2011 | Zehner et al. |
| 8,018,450 B2 | 9/2011 | Kimura et al. |
| 8,035,611 B2 | 10/2011 | Sakamoto |
| 8,044,927 B2 | 10/2011 | Inoue |
| 8,054,253 B2 | 11/2011 | Yoo |
| 8,068,090 B2 | 11/2011 | Machida et al. |
| 8,077,141 B2 | 12/2011 | Duthaler et al. |
| 8,081,155 B2 | 12/2011 | Kajino |
| 8,102,363 B2 | 1/2012 | Hirayama |
| 8,115,729 B2 | 2/2012 | Danner et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |

(56) References Cited

U.S. PATENT DOCUMENTS

| | | |
|---|---|---|
| 8,179,387 B2 | 5/2012 | Shin et al. |
| 8,228,289 B2 | 7/2012 | Nagasaki |
| 8,237,733 B2 | 8/2012 | Rhodes |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,310,439 B2 | 11/2012 | Lee et al. |
| 8,314,784 B2 | 11/2012 | Ohkami et al. |
| 8,319,766 B2 | 11/2012 | Gormish et al. |
| 8,334,836 B2 | 12/2012 | Kanamori et al. |
| 8,373,649 B2 | 2/2013 | Low et al. |
| 8,384,658 B2 | 2/2013 | Albert et al. |
| 8,405,600 B2 | 3/2013 | Reis et al. |
| 8,432,387 B2 | 4/2013 | Lee |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,570,639 B2 | 10/2013 | Masuzawa et al. |
| 8,576,163 B2 | 11/2013 | Miyazaki et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,599,128 B2 | 12/2013 | Markvoort et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,704,753 B2 | 4/2014 | Miyazaki et al. |
| 8,730,153 B2 | 5/2014 | Sprague et al. |
| 8,791,896 B2 | 7/2014 | Kwon et al. |
| 8,810,525 B2 | 8/2014 | Sprague |
| 8,928,562 B2 | 1/2015 | Gates et al. |
| 8,928,641 B2 | 1/2015 | Chiu et al. |
| 8,963,903 B2 | 2/2015 | Sakamoto et al. |
| 8,976,444 B2 | 3/2015 | Zhang et al. |
| 9,013,394 B2 | 4/2015 | Lin |
| 9,013,516 B2 | 4/2015 | Sakamoto et al. |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,299,294 B2 | 3/2016 | Lin et al. |
| 9,373,289 B2 | 6/2016 | Sprague et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,542,895 B2 | 1/2017 | Gates et al. |
| 9,557,623 B2 | 1/2017 | Wang et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,632,386 B2 | 4/2017 | Takanashi et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,966,018 B2 | 5/2018 | Gates et al. |
| 10,036,931 B2 | 7/2018 | Chan et al. |
| 10,062,337 B2 | 8/2018 | Lin et al. |
| 10,214,647 B2 | 2/2019 | Yezek et al. |
| 10,229,641 B2 | 3/2019 | Yang et al. |
| 10,319,313 B2 | 6/2019 | Harris et al. |
| 10,339,876 B2 * | 7/2019 | Lin .................. G09G 3/344 |
| 2003/0102858 A1 | 6/2003 | Jacobson et al. |
| 2003/0193565 A1 | 10/2003 | Wen |
| 2004/0074120 A1 | 4/2004 | Fryer et al. |
| 2004/0246562 A1 | 12/2004 | Chung et al. |
| 2005/0253777 A1 | 11/2005 | Zehner et al. |
| 2006/0023126 A1 | 2/2006 | Johnson |
| 2006/0119567 A1 | 6/2006 | Zhou et al. |
| 2006/0132426 A1 | 6/2006 | Johnson |
| 2006/0164405 A1 | 7/2006 | Zhou |
| 2006/0232547 A1 | 10/2006 | Johnson et al. |
| 2006/0291125 A1 | 12/2006 | Zhou et al. |
| 2007/0035510 A1 | 2/2007 | Zhou et al. |
| 2007/0052668 A1 * | 3/2007 | Zhou .................. G09G 3/344 |
| | | 345/107 |
| 2007/0057907 A1 | 3/2007 | Ishii et al. |
| 2007/0080926 A1 | 4/2007 | Zhou et al. |
| 2007/0080928 A1 | 4/2007 | Ishii et al. |
| 2007/0091117 A1 | 4/2007 | Zhou et al. |
| 2007/0091418 A1 | 4/2007 | Danner et al. |
| 2007/0103427 A1 | 5/2007 | Zhou et al. |
| 2007/0132687 A1 | 6/2007 | Johnson |
| 2007/0176889 A1 | 8/2007 | Zhou et al. |
| 2007/0176912 A1 | 8/2007 | Beames et al. |
| 2007/0212022 A1 | 9/2007 | Zhou et al. |
| 2007/0262949 A1 | 11/2007 | Zhou et al. |
| 2007/0297038 A1 * | 12/2007 | Chopra .................. G02B 26/026 |
| | | 359/296 |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0150886 A1 | 6/2008 | Johnson et al. |
| 2008/0158142 A1 | 7/2008 | Zhou et al. |
| 2008/0212165 A1 | 9/2008 | Jagt et al. |
| 2008/0266243 A1 | 10/2008 | Johnson et al. |
| 2008/0273022 A1 | 11/2008 | Komatsu |
| 2008/0303780 A1 | 12/2008 | Sprague et al. |
| 2009/0167754 A1 | 7/2009 | Hatta |
| 2009/0174651 A1 | 7/2009 | Jacobson et al. |
| 2009/0309870 A1 | 12/2009 | Takei |
| 2009/0322721 A1 | 12/2009 | Zehner et al. |
| 2010/0149169 A1 | 6/2010 | Miyasaka |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0238203 A1 | 9/2010 | Stroemer et al. |
| 2010/0265561 A1 | 10/2010 | Gates et al. |
| 2011/0063314 A1 | 3/2011 | Chiu et al. |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2012/0200610 A1 * | 8/2012 | Sakamoto .............. G09G 3/344 |
| | | 345/690 |
| 2012/0256893 A1 * | 10/2012 | Sakamoto .............. G09G 3/344 |
| | | 345/208 |
| 2013/0063333 A1 | 3/2013 | Arango et al. |
| 2013/0194250 A1 | 8/2013 | Amundson et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |

(56) References Cited

U.S. PATENT DOCUMENTS

| | | |
|---|---|---|
| 2014/0253425 A1 | 9/2014 | Zalesky et al. |
| 2014/0293398 A1 | 10/2014 | Wang et al. |
| 2015/0097877 A1* | 4/2015 | Lin .................... G09G 3/344 345/691 |
| 2015/0262255 A1 | 9/2015 | Khajehnouri et al. |
| 2015/0262551 A1 | 9/2015 | Zehner et al. |
| 2016/0140910 A1 | 5/2016 | Amundson |
| 2016/0180777 A1 | 6/2016 | Lin et al. |
| 2017/0263176 A1* | 9/2017 | Lin .................... G09G 3/2003 |

FOREIGN PATENT DOCUMENTS

| | | |
|---|---|---|
| JP | 2002014654 A | 1/2002 |
| JP | 2008209893 A | 9/2008 |
| JP | 2009116041 A | 5/2009 |
| JP | 2009145751 A | 7/2009 |
| JP | 2009192786 A | 8/2009 |
| JP | 2010181477 A | 8/2010 |
| JP | 2011059525 | 3/2011 |
| JP | 2011158783 A | 8/2011 |
| KR | 20070082680 A | 8/2007 |
| KR | 20080055331 A | 6/2008 |
| WO | 2008001288 A1 | 1/2008 |

OTHER PUBLICATIONS

Sprague, R.A., "Active Matrix Displays for e-readers Using Microcup Electrophoretic.", Presentation conducted at SID 2011, 49 Int'l Symposium, Seminar and Exhibition, Los Angeles Convention Center, USA (May 18, 2011) . May 18, 2011.

Kao, W.C., "Configurable Timing Controller Design for Active Matrix Electrophoretic Display.", IEEE Transactions on Consumer Electronics, vol. 55, Issue 1, pp. 1-5 (Feb. 2009). Feb. 1, 2009.

Kao, W.C. et al., "Configurable Timing Controller Design for Active Matrix Electrophoretic Display with 16 Gray Levels.", ICCE 2009 Digest of Technical Papers, 10.2-2, (Jan. 2009). Jan. 14, 2009.

Kao, W.C. et al., "Integrating Flexible Electrophoretic Display And One-Time Password Generator in Smart Cards.", ICCE Digest of Technical Papers, p. 4-3, (Jan. 2008). Jan. 13, 2008.

Korean Intellectual Property Office; PCT/US2014/059361; International Search Report & Written Opinion; dated Jan. 8, 2015, dated Jan. 8, 2015.

European Patent Office; EP Appl. No. 14852627.0; The Partial Supplementary European Search Report; dated Jun. 8, 2017 dated Jun. 8, 2017.

European Patent Office; EP Appl. No. 14852627.0; Extended European Search Report; dated Oct. 12, 2017, dated Oct. 12, 2017.

Korean Intellectual Property Office, PCT/US2018/027897, International Search Report and Written Opinion, dated Sep. 17, 2018, dated Sep. 17, 2018.

* cited by examiner

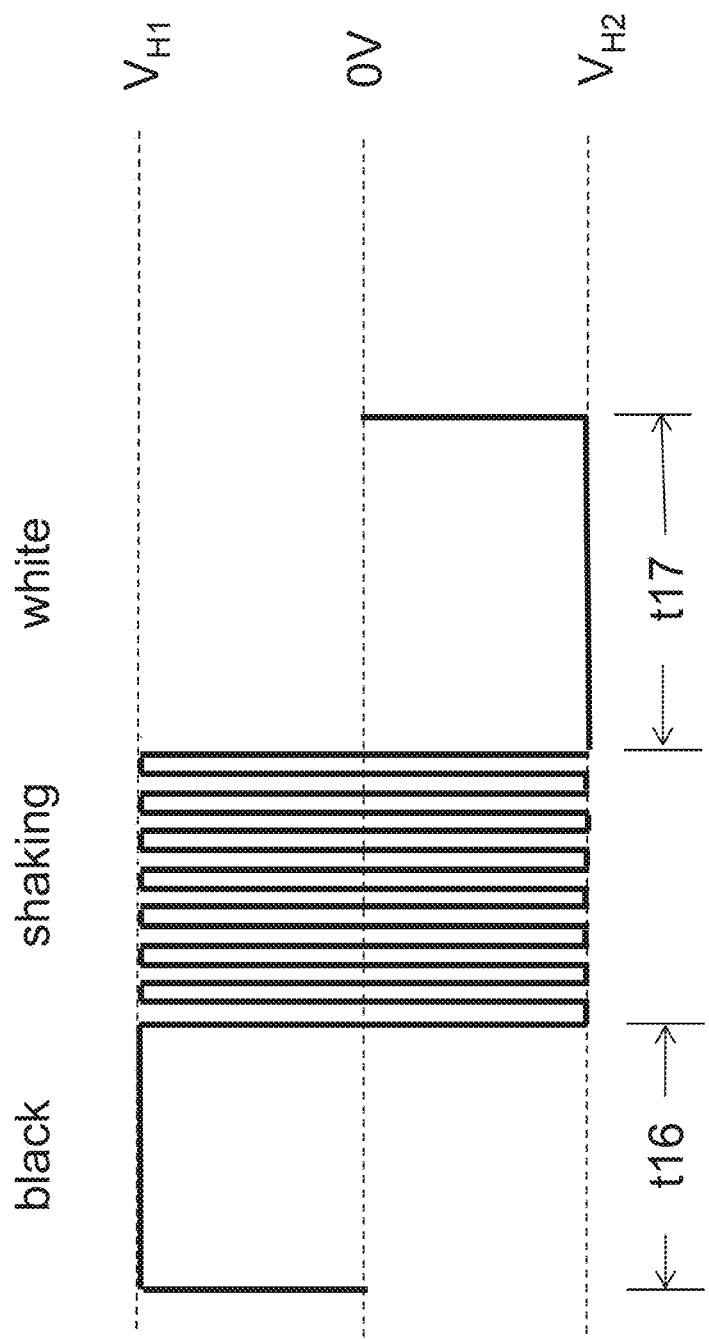

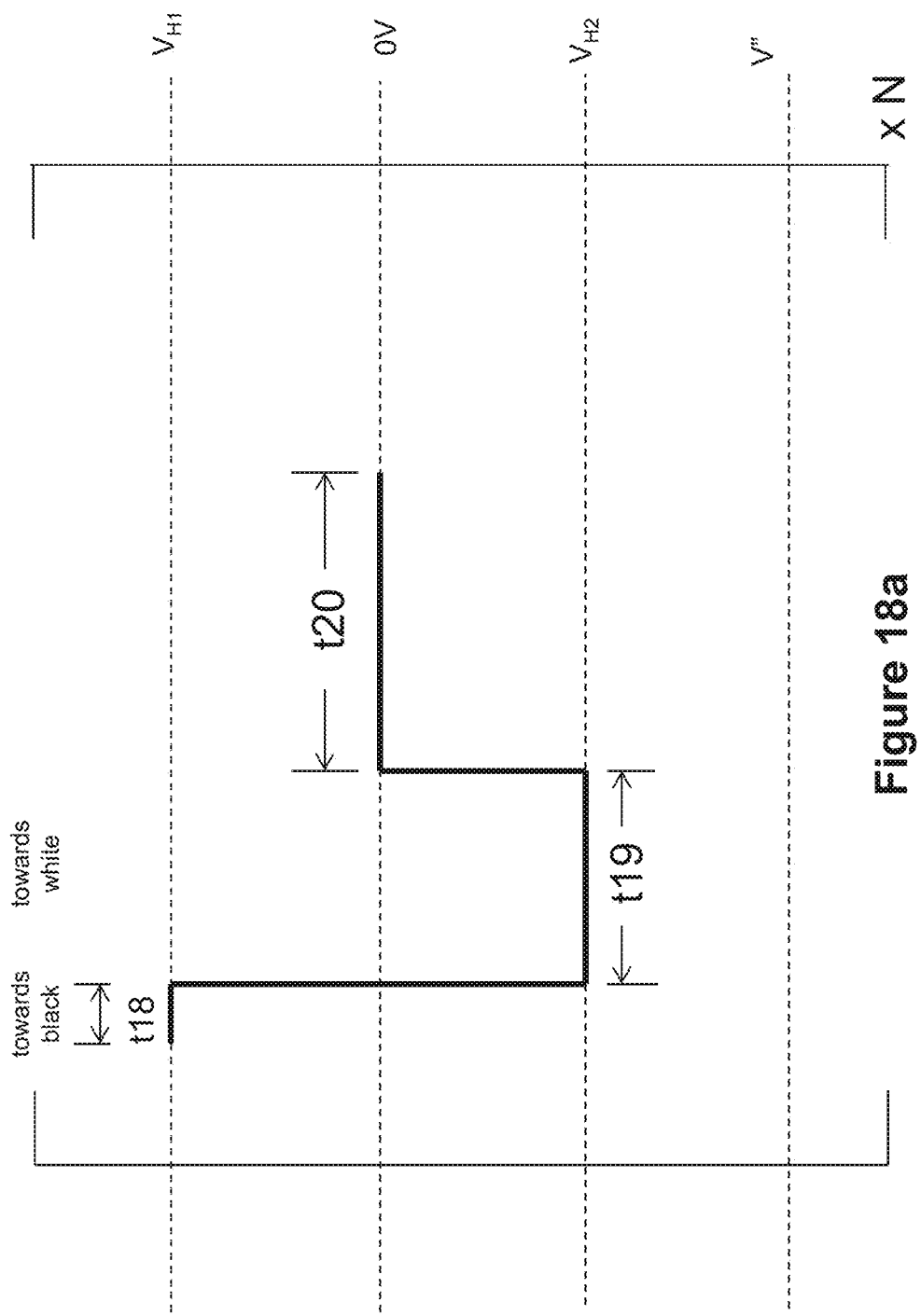

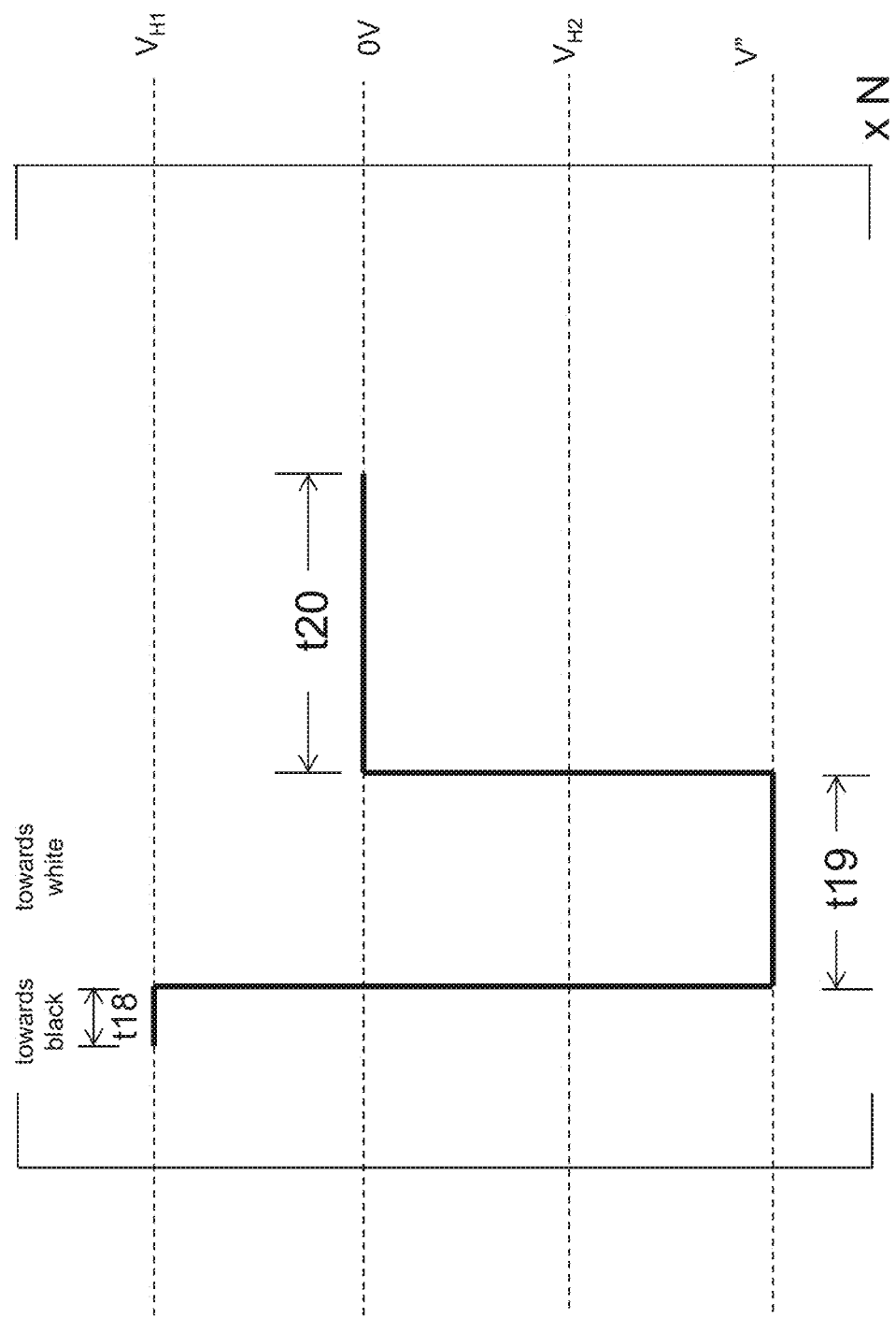

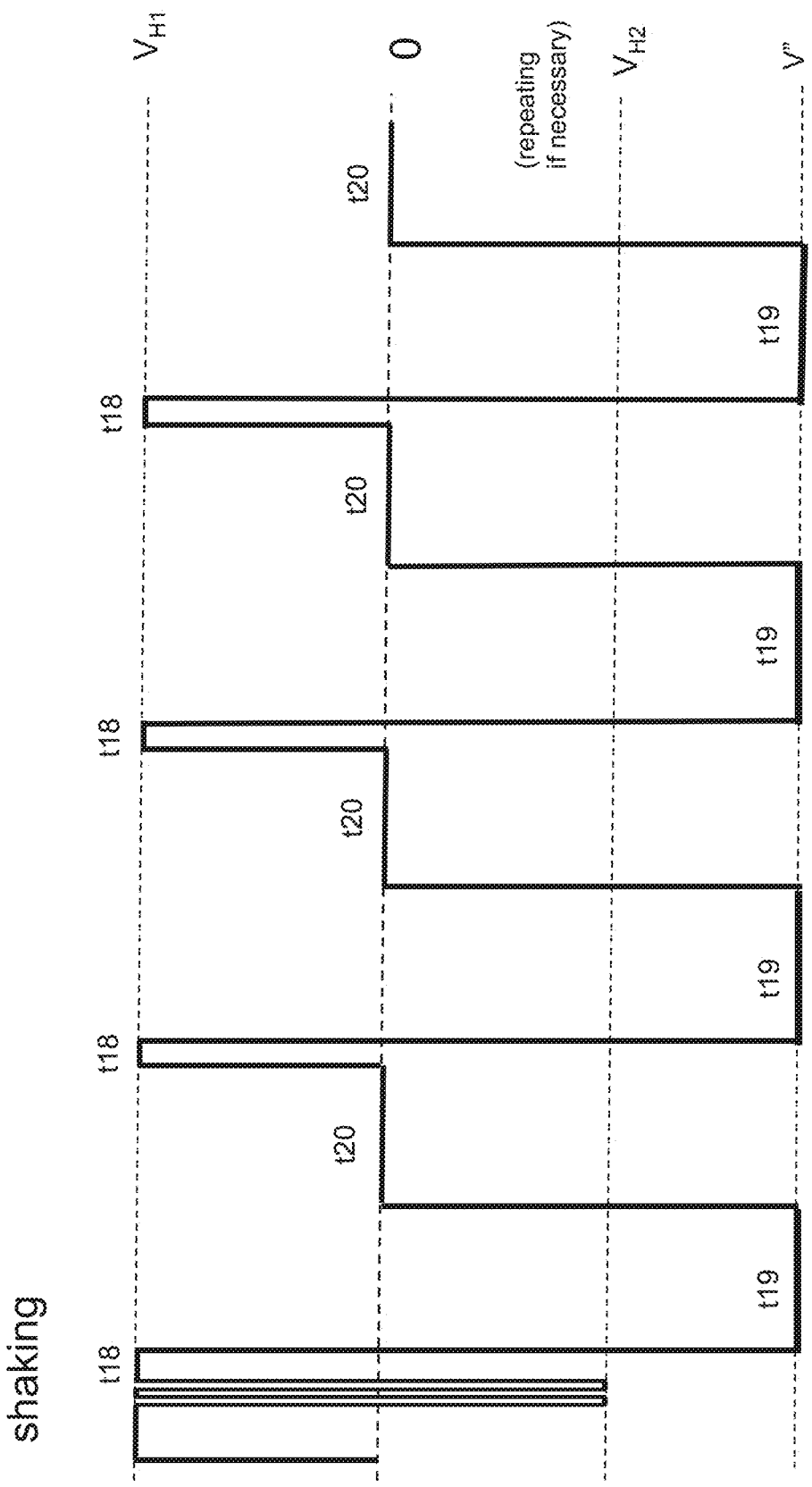

DRIVING METHODS FOR COLOR DISPLAY DEVICE

This application is a continuation of U.S. patent application Ser. No. 14/507,737, filed Oct. 6, 2014, which claims the benefit of U.S. Provisional Application Nos. 61/887,821, filed Oct. 7, 2013; 61/925,055, filed Jan. 8, 2014; 61/942,407, filed Feb. 20, 2014; 61/979,464, filed Apr. 14, 2014; and 62/004,713, filed May 29, 2014. The contents of all patents, applications, and publications identified herein are incorporated herein by reference in their entireties.

FIELD OF THE INVENTION

The present invention is directed to driving methods for color display devices to display high quality color states.

BACKGROUND OF THE INVENTION

In order to achieve a color display, color filters are often used. The most common approach is to add color filters on top of black/white sub-pixels of a pixilated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When a black state is desired, all three-sub-pixels are turned to the black state. When a white state is desired, the three sub-pixels are turned to red, green and blue, respectively, and as a result, a white state is seen by the viewer.

The biggest disadvantage of such a technique is that since each of the sub-pixels has a reflectance of about one third (⅓) of the desired white state, the white state is fairly dim. To compensate this, a fourth sub-pixel may be added which can display only the black and white states, so that the white level is doubled at the expense of the red, green or blue color level (where each sub-pixel is now only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with these approaches, the white level is normally substantially less than half of that of a black and white display, rendering it an unacceptable choice for display devices, such as e-readers or displays that need well readable black-white brightness and contrast.

BRIEF DESCRIPTION OF THE DRAWINGS

FIG. 10a demonstrates the relationship of applied driving voltage vs. optical state performance (a*), based on the waveform of FIG. 3, and FIG. 10b demonstrates the relationship of applied driving voltage vs. optical state performance (a*), based on the waveform of FIG. 4.

FIG. 17 depicts a typical waveform for driving a pixel to a white state in a color display device.

FIGS. 18a and 18b illustrate a sixth driving method of the present invention.

FIGS. 19a and 19b depict driving sequences utilizing the sixth driving method of the present invention.

SUMMARY OF THE INVENTION

Figure 1:
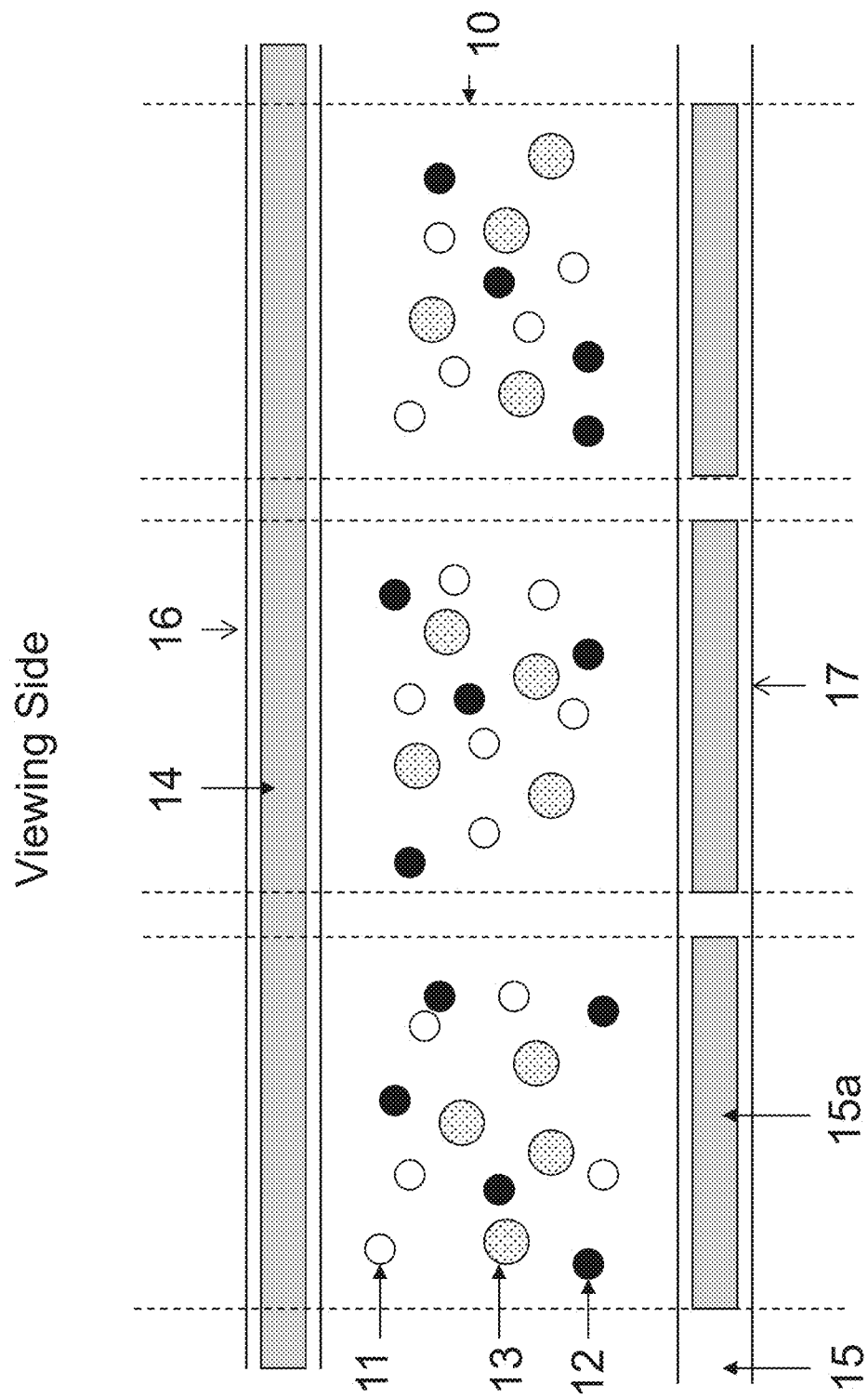
FIG. 1 depicts an electrophoretic display fluid applicable to the present invention.

A first aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein (a) the three types of pigment particles have optical characteristics differing from one another;

(b) the first type of pigment particles and the second type of pigment particles carry opposite charge polarities; and (c) the third type of pigment particles has the same charge polarity as the second type of pigment particles but at a lower intensity, the method comprises the following steps:

(i) applying a first driving voltage to a pixel in the electrophoretic display for a first period of time, wherein the first driving voltage has the same polarity as the first type of pigment particles to drive the pixel towards the color state of the first type of pigment particles at the viewing side;

(ii) applying a second driving voltage to the pixel for a second period of time, wherein the second driving voltage has the same polarity as the third type of pigment particles to drive the pixel towards the color state of the third type of pigment particles at the viewing side; and repeating steps (i) and (ii).

In one embodiment, the first type of pigment particles is negatively charged and the second type of pigment particles is positively charged. In one embodiment, the amplitude of the second driving voltage is less than 50% of the amplitude of the first driving voltage. In one embodiment, steps (i) and (ii) are repeated at least 4 times. In one embodiment, the method further comprises a shaking waveform before step (i). In one embodiment, the method further comprises driving the pixel to the full color state of the first type of pigment particles after the shaking waveform but prior to step (i). In one embodiment, the first period of time is 40 to 140 msec, the second period of time is greater than or equal to 460 msec and steps (i) and (ii) are repeated at least seven times.

A second aspect of the present invention is directed to a driving method for an electrophoretic display comprising a first surface on the viewing side, a second surface on the non-viewing side and an electrophoretic fluid which fluid sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
the method comprises the following steps
  (i) applying a first driving voltage to a pixel in the electrophoretic display for a first period of time, wherein the first driving voltage has the same polarity as the first type of pigment particles to drive the pixel towards the color state of the first type of pigment particles at the viewing side;
  (ii) applying a second driving voltage to the pixel for a second period of time, wherein the second driving voltage has the same polarity as the third type of pigment particles to drive the pixel towards the color state of the third type of pigment particles at the viewing side;
  (iii) applying no driving voltage to the pixel for a third period of time; and
repeating steps (i), (ii) and (iii).

In one embodiment, the first type of pigment particles is negatively charged and the second type of pigment particles is positively charged. In one embodiment, the amplitude of the second driving voltage is less than 50% of the amplitude of the first driving voltage. In one embodiment, steps (i), (ii) and (iii) are repeated at least 4 times. In one embodiment, the method further comprises a shaking waveform before step (i). In one embodiment, the method further comprises a driving step to the full color state of the first type of pigment particles after the shaking waveform but prior to step (i).

A third aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
and the method has a voltage insensitive range of at least 0.7V.

A fourth aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
the method comprises the following steps:
  (i) applying a first driving voltage to a pixel in the electrophoretic display for a first period of time, wherein the first driving voltage has the same polarity as the first type of pigment particles to drive the pixel towards the color state of the first type of pigment particles at the viewing side;
  (ii) applying no driving voltage to the pixel for a second period of time;
  (iii) applying a second driving voltage to the pixel for a third period of time, wherein the second driving voltage is same polarity as the third type of pigment particles to drive the pixel towards the color state of the third type of pigment particles at the viewing side;
  (iv) applying no driving voltage to the pixel for a fourth period of time; and
repeating steps (i)-(iv).

In one embodiment, the first type of pigment particles is negatively charged and the second type of pigment particles is positively charged. In one embodiment, the amplitude of the second driving voltage is less than 50% of the amplitude of the first driving voltage. In one embodiment, steps (i)-(iv) are repeated at least 3 times. In one embodiment, the method further comprises a shaking waveform before step (i). In one embodiment, the method further comprises driving the pixel to the full color state of the first type of pigment particles after the shaking waveform but prior to step (i).

A fifth aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein (a) the three types of pigment particles have optical characteristics differing from one another;
(b) the first type of pigment particles and the second type of pigment particles carry opposite charge polarities; and
(c) the third type of pigment particles has the same charge polarity as the second type of pigment particles but at a lower intensity, the method comprises the following steps:
(i) applying a first driving voltage to a pixel in the electrophoretic display for a first period of time, wherein the first driving voltage has the same polarity as the first type of pigment particles to drive the pixel towards the color state of the first type of pigment particles at the viewing side;
(ii) applying a second driving voltage to the pixel for a second period of time, wherein the second driving voltage has the same polarity as the second type of pigment particles to drive the pixel towards the color state of the second type of pigment particles at the viewing side; and
repeating steps (i) and (ii).

In one embodiment, the method further comprises a wait time where no driving voltage is applied. In one embodiment, the first type of pigment particles is negatively charged and the second type of pigment particles is positively charged. In one embodiment, the second period of time is at least twice as long as the first period of time. In one embodiment, steps (i) and (ii) are repeated for least three times. In one embodiment, the method further comprises a shaking waveform before step (i). In one embodiment, the method further comprises driving the pixel to the full color state of the second type of pigment particles after the shaking waveform but prior to step (i).

A sixth aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
(a) the three types of pigment particles have optical characteristics differing from one another;
(b) the first type of pigment particles and the second type of pigment particles carry opposite charge polarities; and
(c) the third type of pigment particles has the same charge polarity as the second type of pigment particles but at a lower intensity, the method comprises the following steps:
(i) applying a first driving voltage to a pixel in the electrophoretic display for a first period of time, wherein the first driving voltage has the same polarity as the second type of pigment particles to drive the pixel towards the color state of the second type of pigment particles at the viewing side;
(ii) applying a second driving voltage to the pixel for a second period of time, wherein the second driving voltage has the same polarity as the first type of pigment particles to drive the pixel towards the color state of the first type of pigment particles at the viewing side;
(iii) applying no driving voltage to the pixel for a third period of time; and
repeating steps (i), (ii) and (iii).

In one embodiment, the first type of pigment particles is negatively charged and the second type of pigment particles is positively charged. In one embodiment, steps (i), (ii) and (iii) are repeated at least three times. In one embodiment, the amplitude of the second driving voltage is same as that of the driving voltage required to drive the pixel from the color state of the first type of pigment particles to the color state of the second type of pigment particles, or vice versa. In one embodiment, the amplitude of the second driving voltage is higher than the amplitude of the driving voltage required to drive the pixel from the color state of the first type of pigment particles to the color stat of the second type of pigment particles, or vice versa. In one embodiment, the method further comprises a shaking waveform. In one embodiment, the method further comprises driving the pixel to the full color state of the first type of pigment particles after the shaking waveform but prior to step (i).

A seventh aspect of the present invention is directed to a driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
(a) the three types of pigment particles have optical characteristics differing from one another;
(b) the first type of pigment particles and the second type of pigment particles carry opposite charge polarities; and
(c) the third type of pigment particles has the same charge polarity as the second type of pigment particles but at a lower intensity, which method comprises the following steps:
(i) applying a first driving voltage to a pixel in the electrophoretic display for a first period of time, which first driving voltage has the same polarity as the second type of pigment particles to drive the pixel towards the color state of the second type of pigment particles wherein the first period of time is not sufficient to drive the pixel to the full color state of the second type of pigment particles at the viewing side;
(ii) applying a second driving voltage to the pixel for a second period of time, which second driving voltage has the same polarity as the first type of pigment particles to drive the pixel towards a mixed state of the first and second types of pigment particles at the viewing side; and
repeating steps (i) and (ii).

In one embodiment, the first type of pigment particles is negatively charged and the second type of pigment particles is positively charged. In one embodiment, the amplitude of the second driving voltage is less than 50% of the amplitude of the first driving voltage. In one embodiment, steps (i) and (ii) are repeated at least 4 times. In one embodiment, the method further comprises a shaking waveform before step (i). In one embodiment, the method further comprises driving the pixel to the full color state of the first type of pigment particles after the shaking waveform but prior to step (i).

The fourth driving method of the present invention may be applied to a pixel at a color state of the first type of pigment particles or may be applied to a pixel at a color state not the color state of the first type of pigment particles.

DETAILED DESCRIPTION OF THE INVENTION

The present invention is directed to driving methods for color display devices.

The device utilizes an electrophoretic fluid is shown in FIG. 1. The fluid comprises three types of pigment particles dispersed in a dielectric solvent or solvent mixture. For ease of illustration, the three types of pigment particles may be referred to as white particles (11), black particles (12) and colored particles (13). The colored particles are non-white and non-black.

However, it is understood that the scope of the invention broadly encompasses pigment particles of any colors as long as the three types of pigment particles have visually distinguishable colors. Therefore, the three types of pigment particles may also be referred to as a first type of pigment particles, a second type of pigment particles and a third type of pigment particles.

For the white particles (11), they may be formed from an inorganic pigment, such as $TiO_2$, $ZrO_2$, $ZnO$, $Al_2O_3$, $Sb_2O_3$, $BaSO_4$, $PbSO_4$ or the like.

For the black particles (12), they may be formed from CI pigment black 26 or 28 or the like (e.g., manganese ferrite black spinel or copper chromite black spinel) or carbon black.

The third type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the first, second and third types of particles may have other distinct optical characteristics, such as optical transmission, reflectance, luminescence or, in the case of displays intended for machine reading, pseudocolor in the sense of a change in reflectance of electromagnetic wavelengths outside the visible range.

The solvent in which the three types of pigment particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-coming (DC-200).

A display layer utilizing the display fluid of the present invention has two surfaces, a first surface (16) on the viewing side and a second surface (17) on the opposite side of the first surface (16). The second surface therefore is on the non-viewing side. The term "viewing side" refers to the side at which images are viewed.

The display fluid is sandwiched between the two surfaces. On the side of the first surface (16), there is a common electrode (14) which is a transparent electrode layer (e.g., ITO), spreading over the entire top of the display layer. On the side of the second surface (17), there is an electrode layer (15) which comprises a plurality of pixel electrodes (15a).

The display fluid is filled in display cells. The display cells may be aligned with or not aligned with the pixel electrodes. The term "display cell" refers a micro-container which is filled with an electrophoretic fluid. Examples of "display cells" may include the cup-like microcells as described in U.S. Pat. No. 6,930,818 and microcapsules as described in U.S. Pat. No. 5,930,026. The micro-containers may be of any shapes or sizes, all of which are within the scope of the present application.

An area corresponding to a pixel electrode may be referred to as a pixel (or a sub-pixel). The driving of an area corresponding to a pixel electrode is effected by applying a voltage potential difference (or known as a driving voltage or an electric field) between the common electrode and the pixel electrode.

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

The space between two vertical dotted lines denotes a pixel (or a sub-pixel). For brevity, when "pixel" is referred to in a driving method, the term also encompasses "sub-pixel" s.

Two of the three types of pigment particles carry opposite charge polarities and the third type of pigment particles is slightly charged. The term "slightly charged" or "lower charge intensity" is intended to refer to the charge level of the particles being less than about 50%, preferably about 5% to about 30%, the charge intensity of the stronger charged particles. In one embodiment, the charge intensity may be measured in terms of zeta potential. In one embodiment, the zeta potential is determined by Colloidal Dynamics AcoustoSizer IIM with a CSPU-100 signal processing unit, ESA EN #Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

For example, if the black particles are positively charged and the white particles are negatively charged, and then the colored pigment particles may be slightly charged. In other words, in this example, the charges carried by the black and the white particles are much more intense than the charge carried by the colored particles.

In addition, the colored particles which carries a slight charge has a charge polarity which is the same as the charge polarity carried by either one of the other two types of the stronger charged particles.

It is noted that among the three types of pigment particles, the one type of particles which is slightly charged preferably has a larger size.

In addition, in the context of the present application, a high driving voltage ($V_{H1}$ or $V_{H2}$) is defined as a driving voltage which is sufficient to drive a pixel from one extreme color state to another extreme color state. If the first and the second types of pigment particles are the higher charged particles, a high driving voltage then ($V_{H1}$ or $V_{H2}$) refers a driving voltage which is sufficient to drive a pixel from the color state of the first type of pigment particles to the color state of the second type of pigment particles, or vice versa. For example, a high driving voltage, $V_{H1}$, refers to a driving voltage which is sufficient to drive a pixel from the color state of the first type of pigment particles to the color state of the second type of pigment particles, and $V_{H2}$ refers to a driving voltage which is sufficient to drive a pixel from the color state of the second type of pigment particles to the color state of the first type of pigment particles. In this scenario as described, a low driving voltage ($V_L$) is defined as a driving voltage which may be sufficient to drive a pixel to the color state of the third type of pigment particles (which are less charged and may be larger in size) from the color state of the first type of pigment particles. For example, a low driving voltage may be sufficient to drive to the color state of the colored particles while the black and white particles are not seen at the viewing side.

In general, the $V_L$ is less than 50%, or preferably less than 40%, of the amplitude of $V_H$ (e.g., $V_{H1}$ or $V_{H2}$).

The following is an example illustrating a driving scheme of how different color states may be displayed by an electrophoretic fluid as described above.

EXAMPLE

Figure 2:
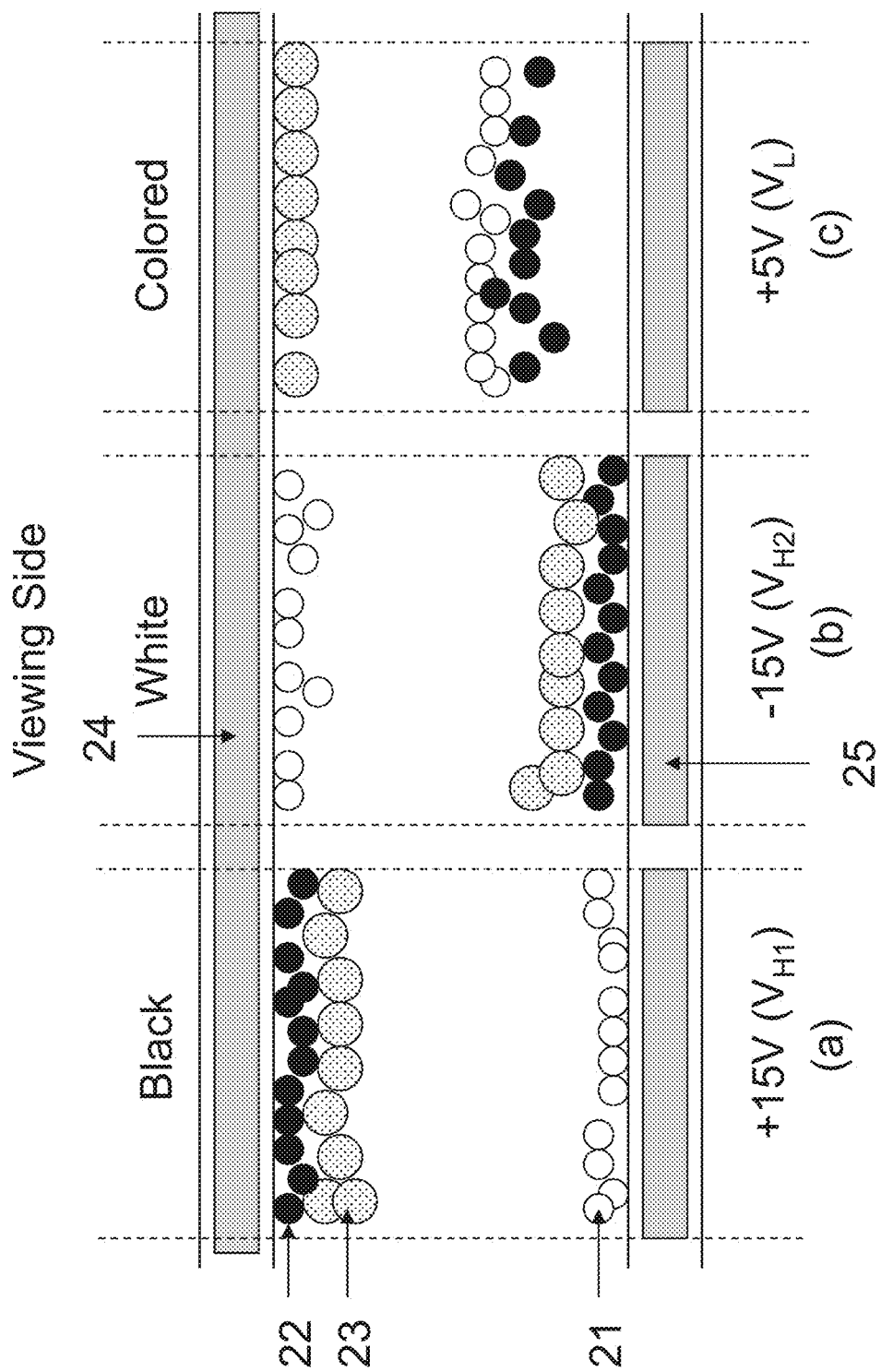
FIG. 2 is a diagram depicting an example of driving scheme.

This example is demonstrated in FIG. 2. The white pigment particles (21) are negatively charged while the black pigment particles (22) are positively charged, and both types of the pigment particles are smaller than the colored particles (23).

The colored particles (23) carry the same charge polarity as the black particles, but are slightly charged. As a result, the black particles move faster than the colored particles (23) under certain driving voltages.

In FIG. 2a, the applied driving voltage is +15V (i.e., $V_{H1}$). In this case, the white particles (21) move to be near or at the pixel electrode (25) and the black particles (22) and the colored particles (23) move to be near or at the common electrode (24). As a result, the black color is seen at the viewing side. The colored particles (23) move towards the common electrode (24) at the viewing side; however because their lower charge intensity and larger size, they move slower than the black particles.

In FIG. 2b, when a driving voltage of −15V (i.e., $V_{H2}$) is applied, the white particles (21) move to be near or at the common electrode (24) at the viewing side and the black particles and the colored particles move to be near or at the pixel electrode (25). As a result, the white color is seen at the viewing side.

It is noted that $V_{H1}$ and $V_{H2}$ have opposite polarities, and have the same amplitude or different amplitudes. In the example as shown in FIG. 2, $V_{H1}$ is positive (the same polarity as the black particles) and $V_{H2}$ is negative (the same polarity as the white particles)

In FIG. 2c, when a low voltage which is sufficient to drive the colored particles to the viewing side and has the same polarity as the colored particles is applied, the white particles are pushed downwards and the colored particles move up towards the common electrode (24) to reach the viewing side. The black particles cannot move to the viewing side because of the low driving voltage which is not sufficient to separate the two stronger and oppositely charged particles, i.e., the black particles and the white particles, from each other when the two types of pigment particles meet.

The driving from the white color state in FIG. 2b to the colored state in FIG. 2c may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles (i.e., white), a second type of pigment particles (i.e., black) and a third type of pigment particles (i.e., colored), all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
which method comprises driving a pixel in the electrophoretic display from the color state of the first type of pigment particles towards the color state of the third type of pigment particles by applying a low driving voltage which is sufficient to drive the third type of pigment particles to the viewing side while leaving the first and second types of pigment particles on the non-viewing side and the polarity of the low driving voltage applied is the same as the polarity of the third type of pigment particles.

In order to drive a pixel to the color state of the third type of pigment particles, i.e., red (see FIG. 2c), the method starts from the color state of the first type of pigment particles, i.e., white (see FIG. 2b).

When the color of the third type of particles is seen at the viewing side, the other two types of the particles may be mixed at the non-viewing side (side opposite of the viewing side), resulting in an intermediate color state between the colors of the first and second types of particles. If the first and second types of particles are black and white and the third type of particles is red, then in FIG. 2c, when the red color is seen at the viewing side, a grey color is at the non-viewing side.

The driving method ideally would ensure both color brightness (i.e., preventing the black particles from being seen) and color purity (i.e., preventing the white particles from being seen) in the scenario of FIG. 2c. However, in practice, this desired result is difficult to achieve for various reasons, including particle size distribution and particle charge distribution.

One solution to this is the use of a shaking waveform prior to driving from the color state of the first type of pigment particles (i.e., white) to the color state of the third type of pigment particles (i.e., red). The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec. The notation, "msec", stands for millisecond.

The shaking waveform may be applied to a pixel regardless of the optical state (black, white or red) prior to a driving voltage being applied. After the shaking waveform is applied, the optical state would not be a pure white, pure black or pure red. Instead, the color state would be from a mixture of the three types of pigment particles.

For the method as described above, a shaking waveform is applied prior to the pixel being driven to the color state of the first type of pigment particles (i.e., white). With this added shaking waveform, even though the white state is measurably the same as that without the shaking waveform, the color state of the third type of pigment particles (i.e., red) would be significantly better than that without the shaking waveform, on both color brightness and color purity. This is an indication of better separation of the white particles from the red particles as well as better separation of the black particles from the red particles.

Each of the driving pulses in the shaking waveform is applied for not exceeding half of the driving time required for driving from the full black state to the full white state, or vice versa. For example, if it takes 300 msec to drive a pixel from a full black state to a full white state, or vice versa, the shaking waveform may consist of positive and negative pulses, each applied for not more than 150 msec. In practice, it is preferred that the pulses are shorter.

It is noted that in all of the drawings throughout this application, the shaking waveform is abbreviated (i.e., the number of pulses is fewer than the actual number).

Figure 3:
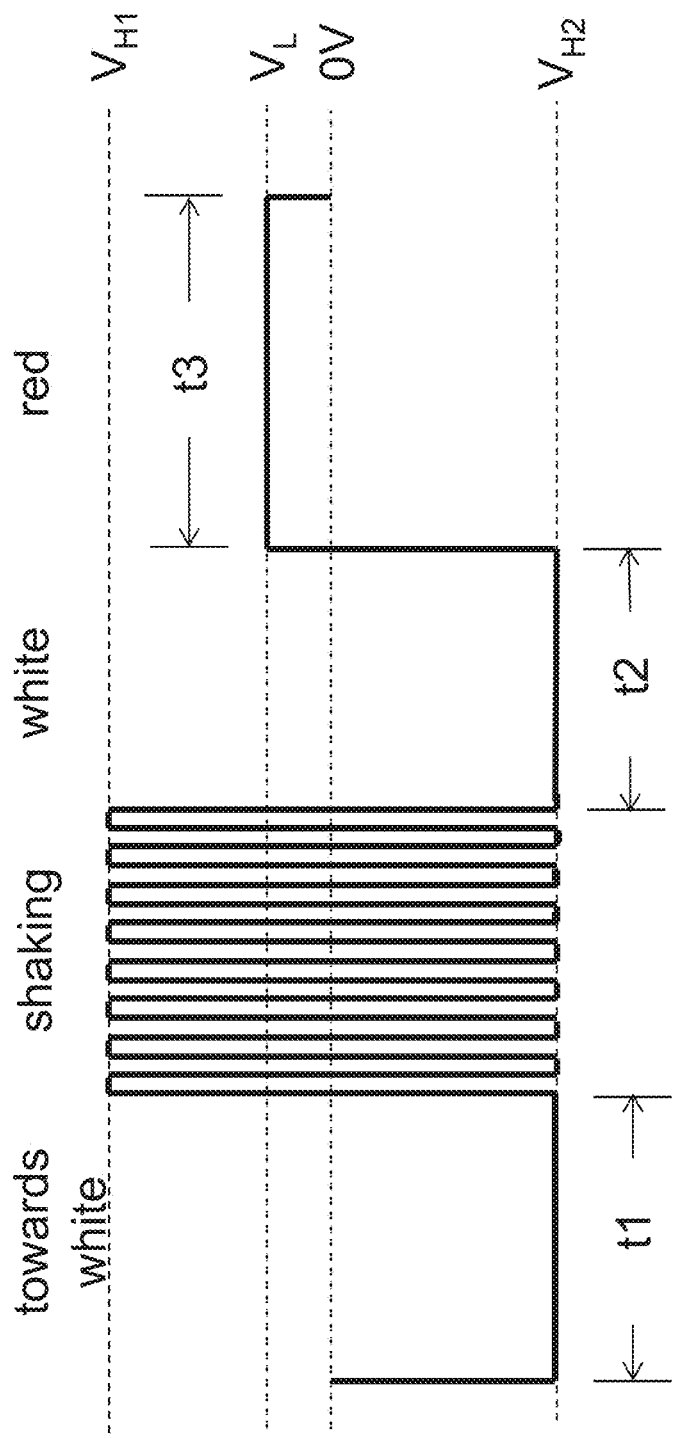
FIG. 3 illustrates a typical waveform for driving a pixel from a white state to a red state in a color display device.

The driving method is shown in FIG. 3, in which a high negative driving voltage ($V_{H2}$, e.g., −15V) is applied for a period of t2, to drive a pixel towards a white state after a shaking waveform. From the white state, the pixel may be driven towards the colored state (i.e., red) by applying a low positive voltage ($V_L$, e.g., +5V) for a period of t3 (that is, driving the pixel from FIG. 2b to FIG. 2c).

The driving period "t2" is a time period sufficient to drive a pixel to the white state when $V_{H2}$ is applied and the driving period "t3" is a time period sufficient to drive the pixel to the red state from the white state when $V_L$ is applied. A driving voltage is preferably applied for a period of t1 before the shaking waveform to ensure DC balance. The term "DC balance", throughout this application, is intended to mean that the driving voltages applied to a pixel is substantially zero when integrated over a period of time (e.g., the period of an entire waveform).

Figure 4:
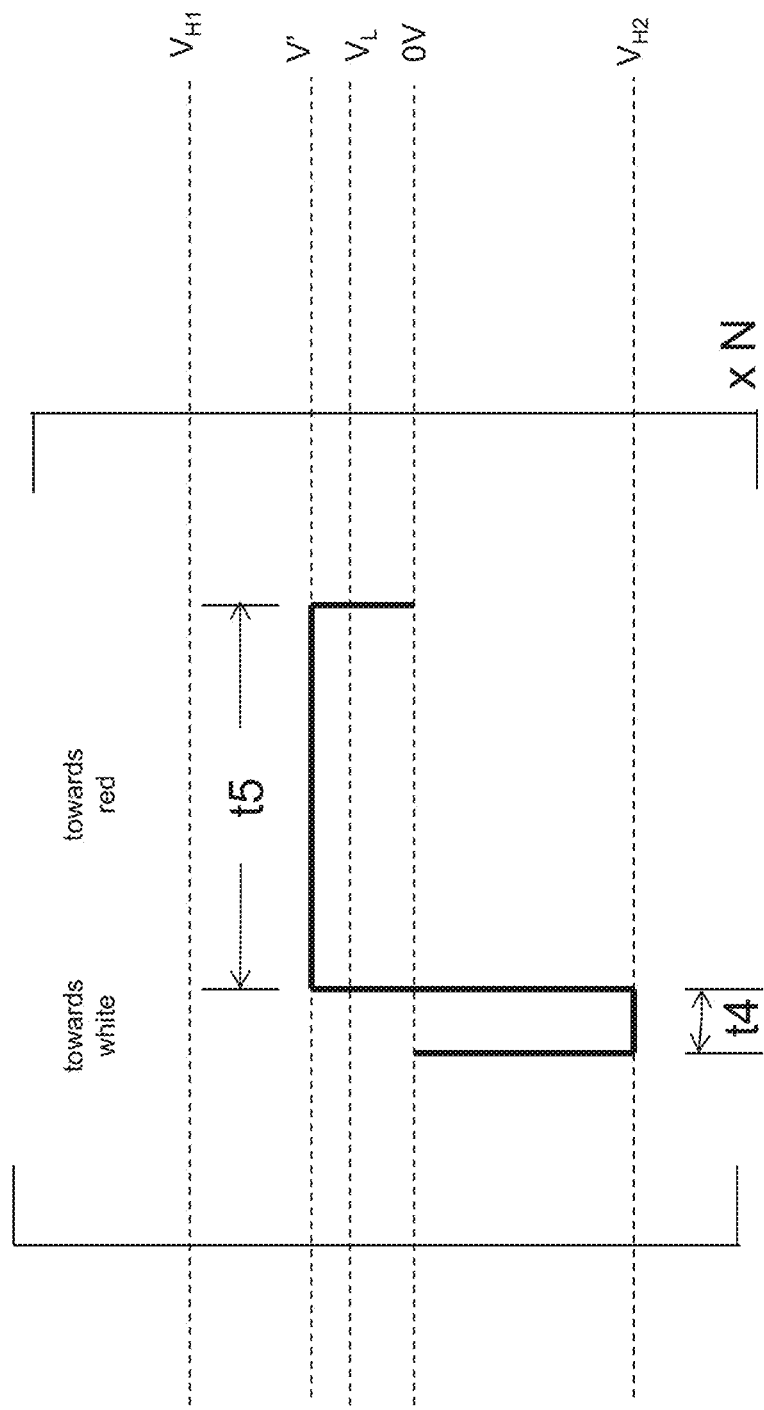
FIG. 4 illustrates a first driving method of the present invention.

The First Driving Method:

The first driving method of the present invention is illustrated in FIG. 4. It relates to a driving waveform which is used to replace the driving period of t3 in FIG. 3.

In an initial step, a high negative driving voltage ($V_{H2}$, e.g., −15V) is applied, which is followed by a positive driving voltage (+V') to drive a pixel towards the red state. The amplitude of the +V' is less than 50% of the amplitude of $V_H$ (e.g., $V_{H1}$ or $V_{H2}$).

In this driving waveform, a high negative driving voltage ($V_{H2}$) is applied for a period of t4 to push the white particles towards the viewing side, which is then followed by applying a positive driving voltage of +V' for a period of t5, which pulls the white particles down and pushes the red particles towards the viewing side.

In one embodiment, t4 may be in the range of 20-400 msec and t5 may be ≥200 msec.

The waveform of FIG. 4 is repeated for at least 4 cycles (N≥4), preferably at least 8 cycles. The red color becomes more intense after each driving cycle.

The driving method of FIG. 4 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein (a) the three types of pigment particles have optical characteristics differing from one another;
(b) the first type of pigment particles and the second type of pigment particles carry opposite charge polarities; and
(c) the third type of pigment particles has the same charge polarity as the second type of pigment particles but at a lower intensity, which method comprises the following steps:
(i) applying a first driving voltage to a pixel in the electrophoretic display for a first period of time, which first driving voltage has the same polarity as the first type of pigment particles to drive the pixel towards the color state of the first type of pigment particles at the viewing side;
(ii) applying a second driving voltage to the pixel for a second period of time, which second driving voltage has the same polarity as the third type of pigment particles to drive the pixel towards the color state of the third type of pigment particles at the viewing side; and repeating steps (i) and (ii).

In one embodiment, the first type of pigment particles is negatively charged and the second type of pigment particles is positively charged.

In one embodiment, the amplitude of the second driving voltage is less than 50% of the amplitude of the first driving voltage.

Figure 5:
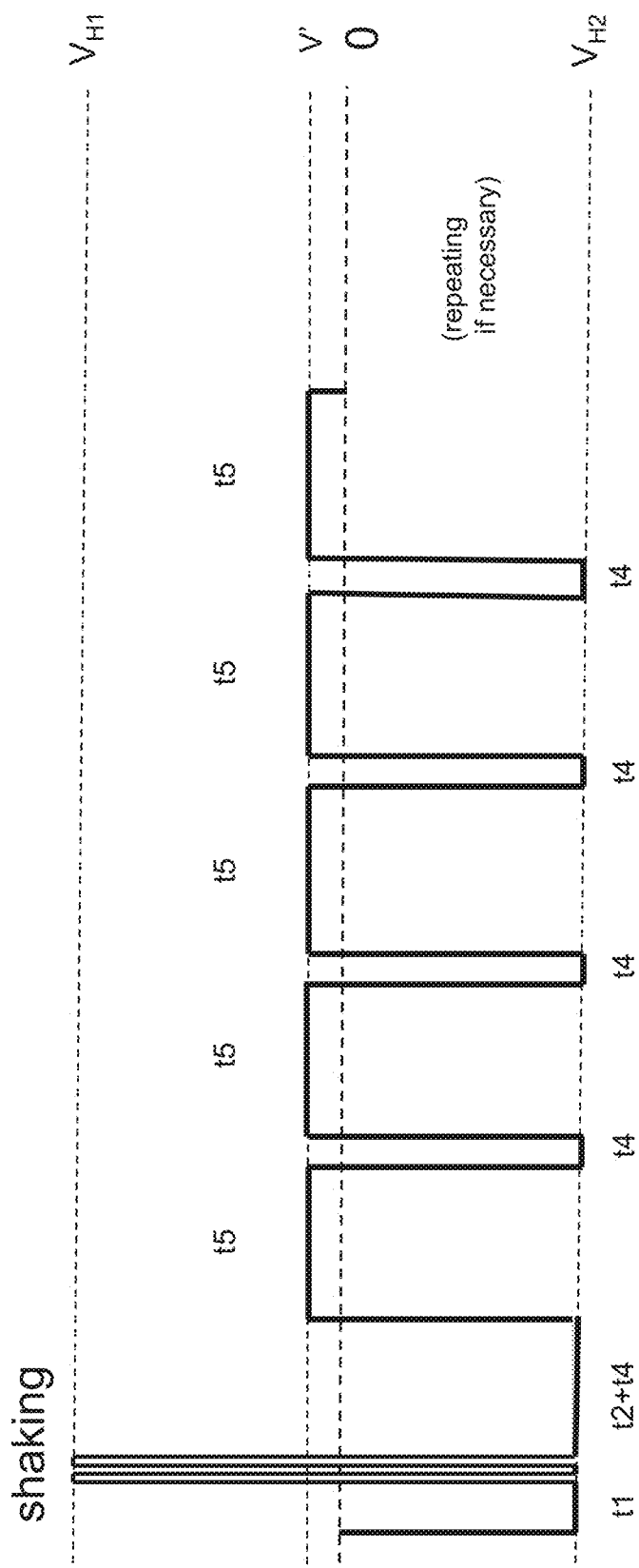
FIGS. 5 and 6 depict driving sequences utilizing the first driving method of the present invention.

As stated, the driving waveform as shown in FIG. 4 may be used to replace the driving period of t3 in FIG. 3 (see FIG. 5). In other words, the driving sequence may be: shaking waveform, followed by driving towards the white state for a period of t2 and then applying the waveform of FIG. 4.

Figure 6:
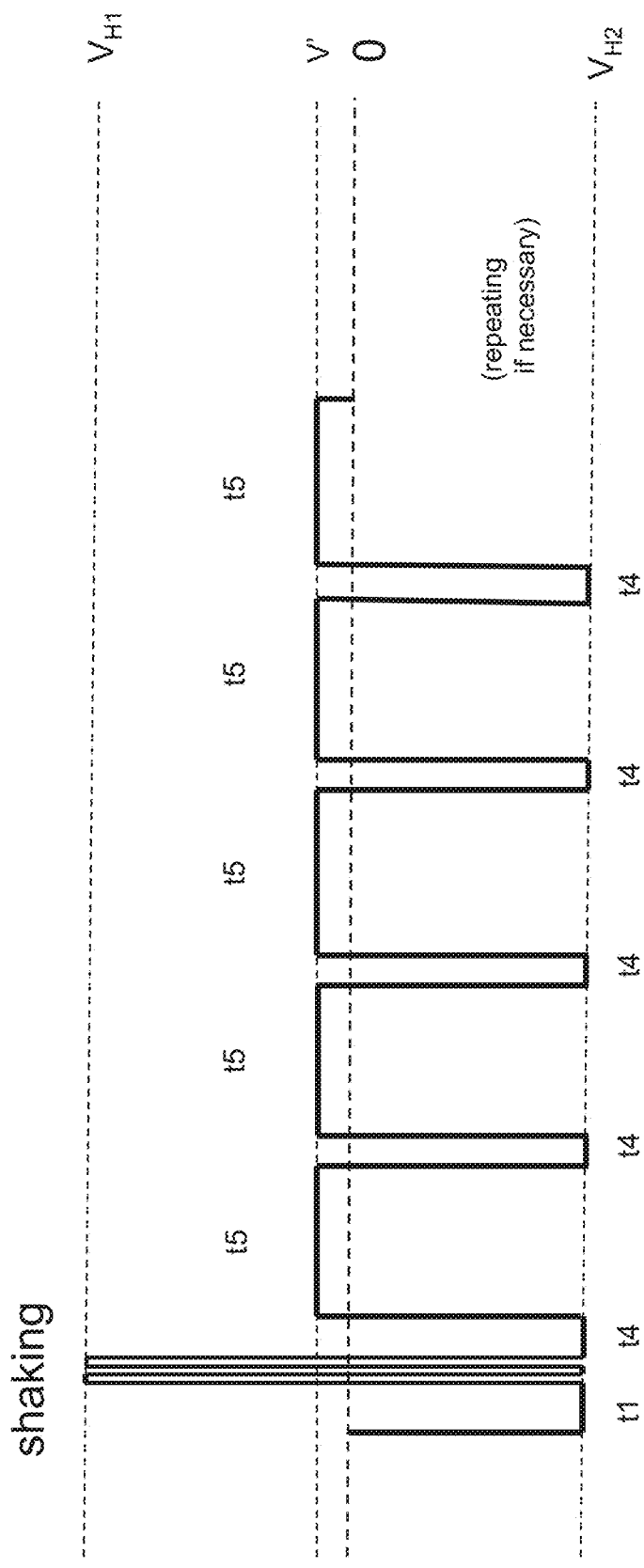

In another embodiment, the step of driving to the white state for a period of t2 may be eliminated and in this case, a shaking waveform is applied before applying the waveform of FIG. 4 (see FIG. 6).

In one embodiment, the driving sequence of FIG. 5 or FIG. 6 is DC balanced.

Figure 7:
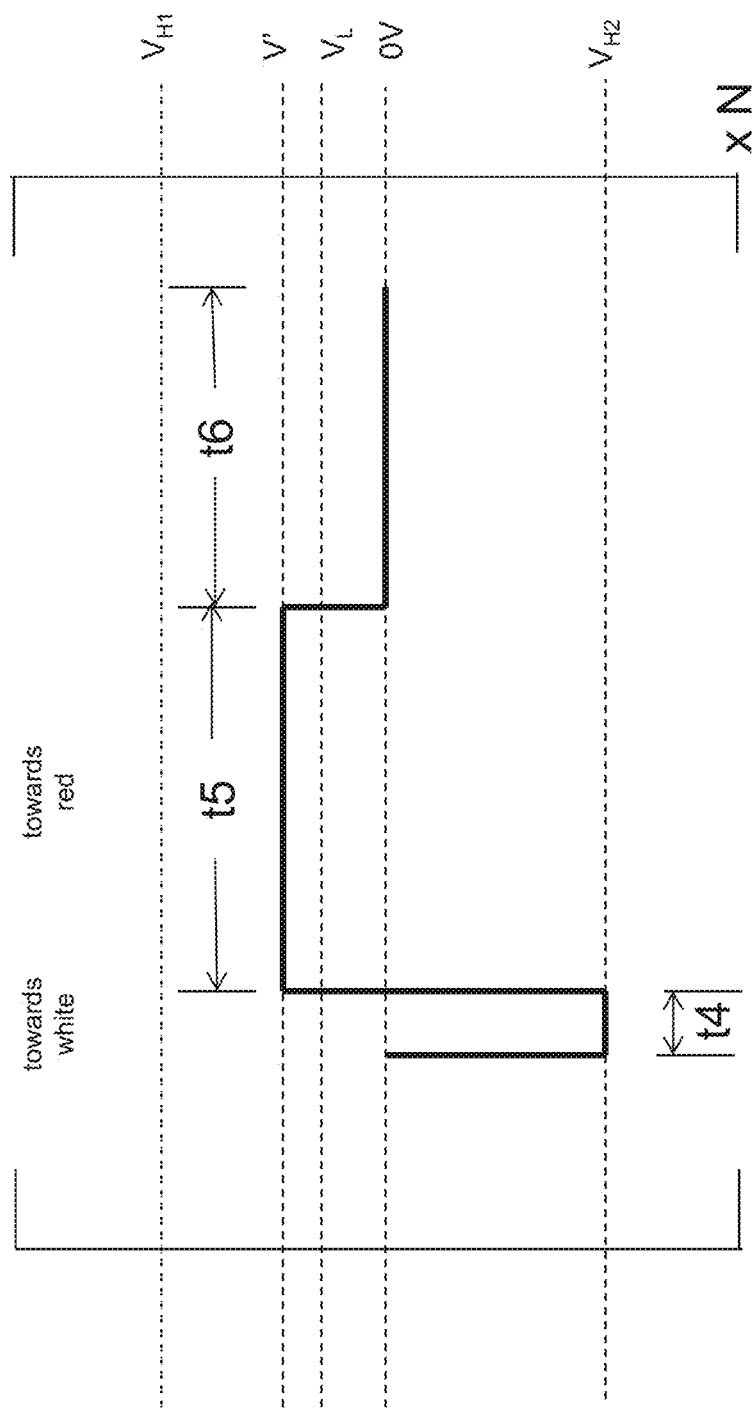
FIG. 7 illustrates a second driving method of the present invention.

The Second Driving Method:

The second driving method the present invention is illustrated in FIG. 7. It relates to an alternative to the driving waveform of FIG. 4, which may also be used to replace the driving period of t3 in FIG. 3.

In this alternative waveform, there is a wait time "t6" added. During the wait time, no driving voltage is applied. The entire waveform of FIG. 7 is also repeated for multiple cycles (for example, N≥4).

The waveform of FIG. 7 is designed to release the charge imbalance stored in the dielectric layers in an electrophoretic display device, especially when the resistance of the dielectric layers is high, for example, at a low temperature.

In the context of the present application, the term "low temperature" refers to a temperature below about 10° C.

The wait time presumably can dissipate the unwanted charge stored in the dielectric layers and cause the short pulse ("t4") for driving a pixel towards the white state and the longer pulse ("t5") for driving the pixel towards the red state to be more efficient. As a result, this alternative driving method will bring a better separation of the low charged pigment particles from the higher charged ones. The wait time ("t6") can be in a range of 5-5,000 msec, depending on the resistance of the dielectric layers.

This driving method of FIG. 7 may be summarized as follows:

A driving method for an electrophoretic display comprising a first surface on the viewing side, a second surface on the non-viewing side and an electrophoretic fluid which fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
which method comprises the following steps
  (i) applying a first driving voltage to a pixel in the electrophoretic display for a first period of time, which first driving voltage has the same polarity as the first type of pigment particles to drive the pixel towards the color state of the first type of pigment particles at the viewing side;
  (ii) applying a second driving voltage to the pixel for a second period of time, which second driving voltage has the same polarity as the third type of pigment particles to drive the pixel towards the color state of the third type of pigment particles at the viewing side;
  (iii) applying no driving voltage to the pixel for a third period of time; and
repeating steps (i), (ii) and (iii).

In one embodiment, the first type of pigment particles is negatively charged and the second type of pigment particles is positively charged.

In one embodiment, the amplitude of the second driving voltage is less than 50% of the amplitude of the first driving voltage.

Figure 8:
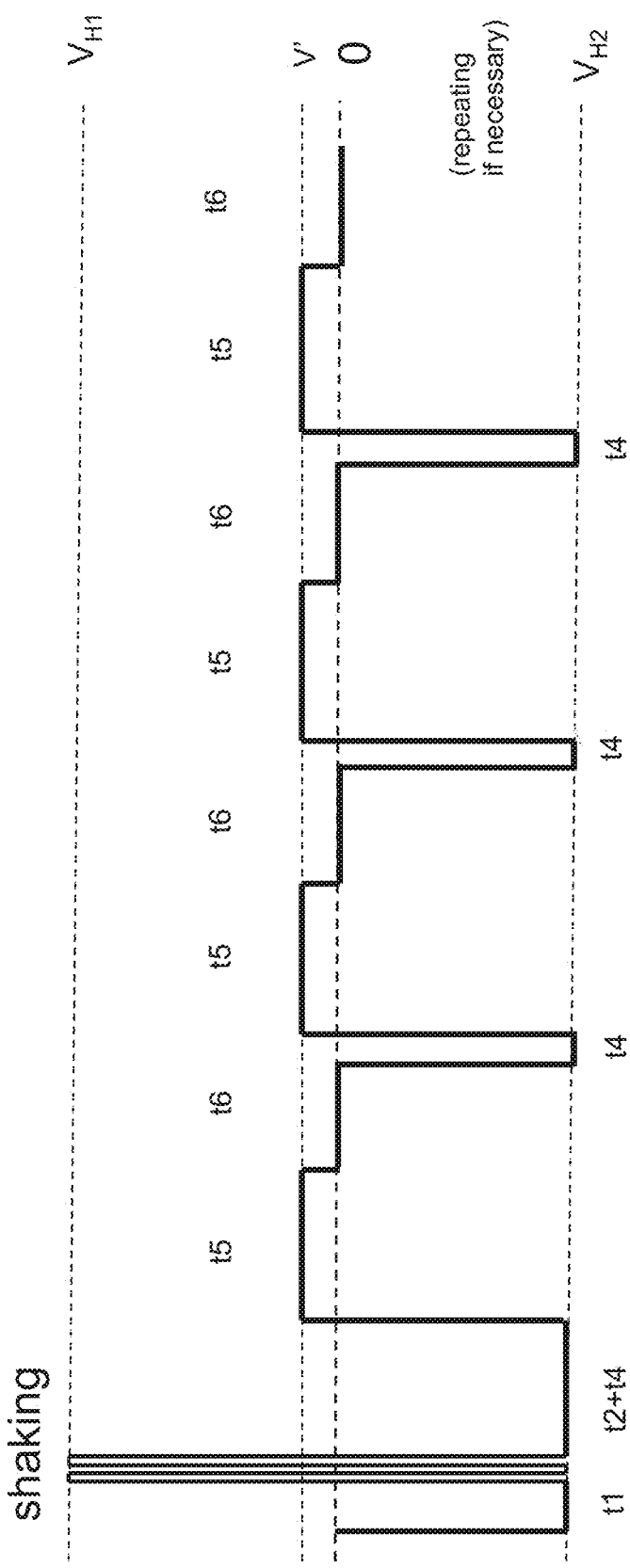
FIGS. 8 and 9 depict driving sequences utilizing the second driving method of the present invention.

As stated, the driving waveform as shown in FIG. 7 may also be used to replace the driving period of t3 in FIG. 3 (see FIG. 8). In other words, the driving sequence may be: shaking waveform, followed by driving towards the white state for a period of t2 and then applying the waveform of FIG. 7.

Figure 9:
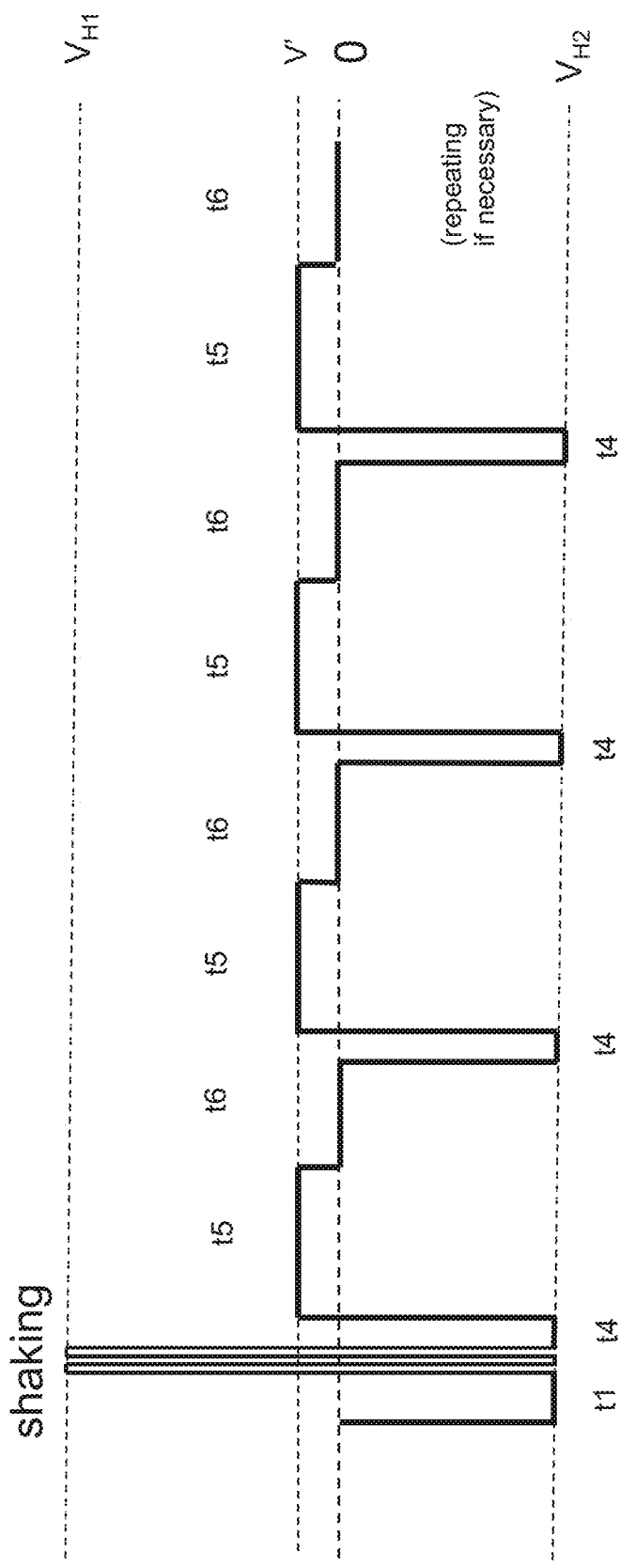

In another embodiment, the step of driving to the white state for a period of t2 may be eliminated and in this case, a shaking waveform is applied before applying the waveform of FIG. 7 (see FIG. 9).

In another embodiment, the driving sequence of FIG. 8 or FIG. 9 is DC balanced.

It should be noted that the lengths of any of the driving periods referred to in this application may be temperature dependent.

Figure 10A:
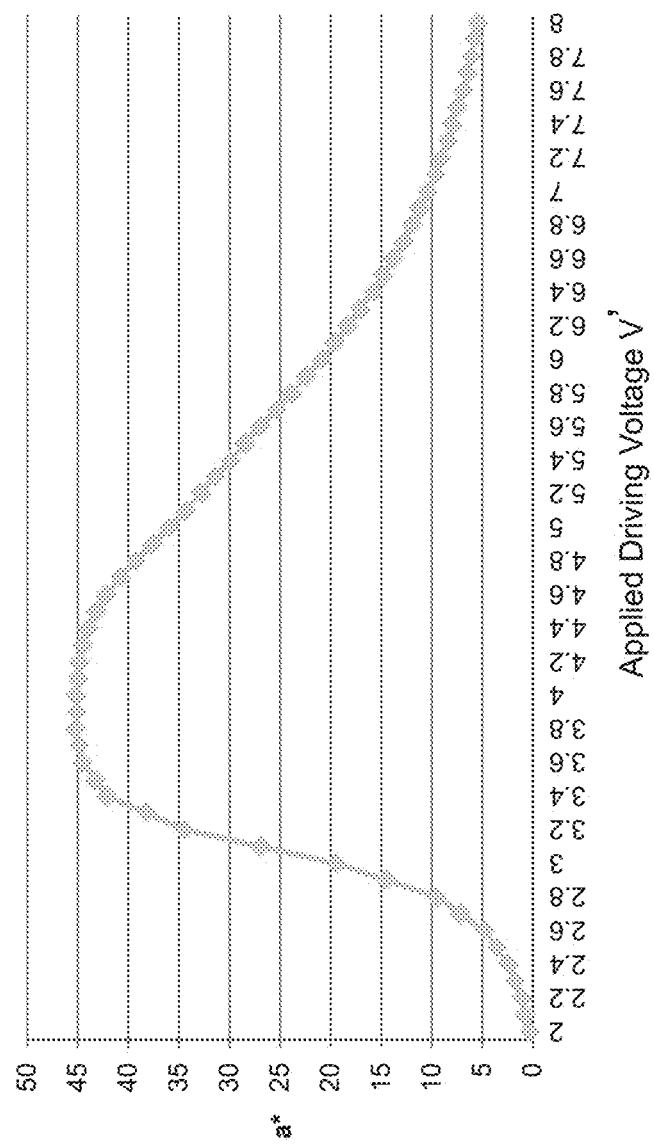
FIGS. 10a and 10b illustrate a third driving method of the present invention.

The Third Driving Method:

FIG. 10a demonstrates the relationship between applied driving voltage (V') and the optical performance, based on the waveform of FIG. 3. As shown, the positive driving voltage V' applied may impact on the red state performance of a color display device described above. The red state performance of the display device is expressed as a* value, utilizing the L*a*b* color system.

The maximum a* in FIG. 10a appears at the applied driving voltage V', in FIG. 3, being about 3.8V. However, if a change of ±0.5V is made to the applied driving voltage, the resulting a* value would be about 37 which is roughly 90% of the maximum a*, thus still acceptable. This tolerance can be beneficial to accommodate changing of the driving voltages caused by, for example, variation in the electronic components of a display device, the drop of battery voltage over time, batch variation of the TFT backplanes, batch variation of the display devices or temperature and humidity fluctuations.

Based on the concept of FIG. 10a, a study was performed to find a range of driving voltages V' that can drive to the red state with an over 90% of the maximum a* value. In other words, when any of the driving voltages in the range is applied, the optical performance is not significantly affected. Therefore, the range may be referred to as "voltage-insensitive" range". The wider the "voltage insensitive" range, the more tolerant the driving method is to batch variations and environmental changes.

In FIG. 4, there are three parameters to be considered for this study, t4, t5 and N. The effects of the three parameters on the voltage-insensitive range are interactive and non-linear.

Following the model of FIG. 10a, one can find the optimum value sets for the three parameters to achieve the widest voltage-insensitive range for the waveform of FIG. 4. The results are summarized in FIG. 10b.

Figure 10B:
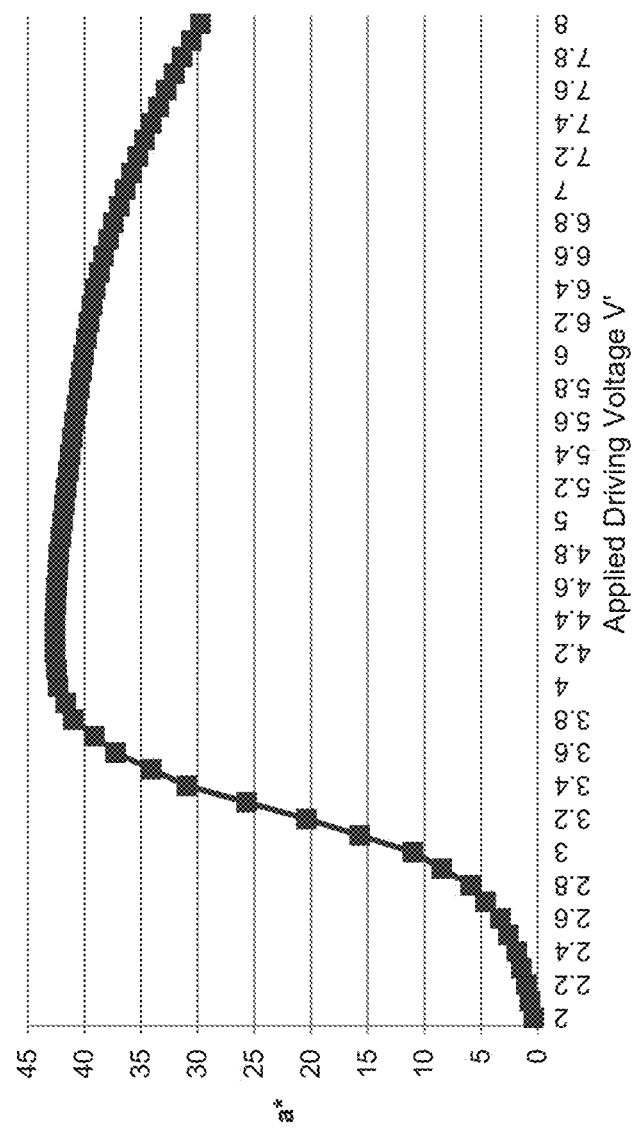

In one example, when t4 is between 40~140 msec, t5 is greater than or equal to 460 msec and N is greater than or equal to 7, the voltage-insensitive range (i.e., 3.7V to 6.5V) based on FIG. 10b is twice the width of the voltage-insensitive range (i.e., 3.3V-4.7V) based on FIG. 10a.

The optimized parameters discussed above are also applicable to any of the driving methods of the present invention.

The third driving method therefore may be summarized as follows:

A driving method for an electrophoretic display comprising a first surface on the viewing side, a second surface on the non-viewing side and an electrophoretic fluid which fluid is sandwiched between a common electrode and a layer of pixel electrode and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
and the method has a voltage insensitive range of at least 0.7V.

In such a method, when a driving voltage within such a range is applied, the optical quality of a color state achieved is at least 90% of the maximum acceptable "a" value.

It is also noted that the data shown in FIGS. 10a and 10b are collected under ambient temperature.

Figure 11:
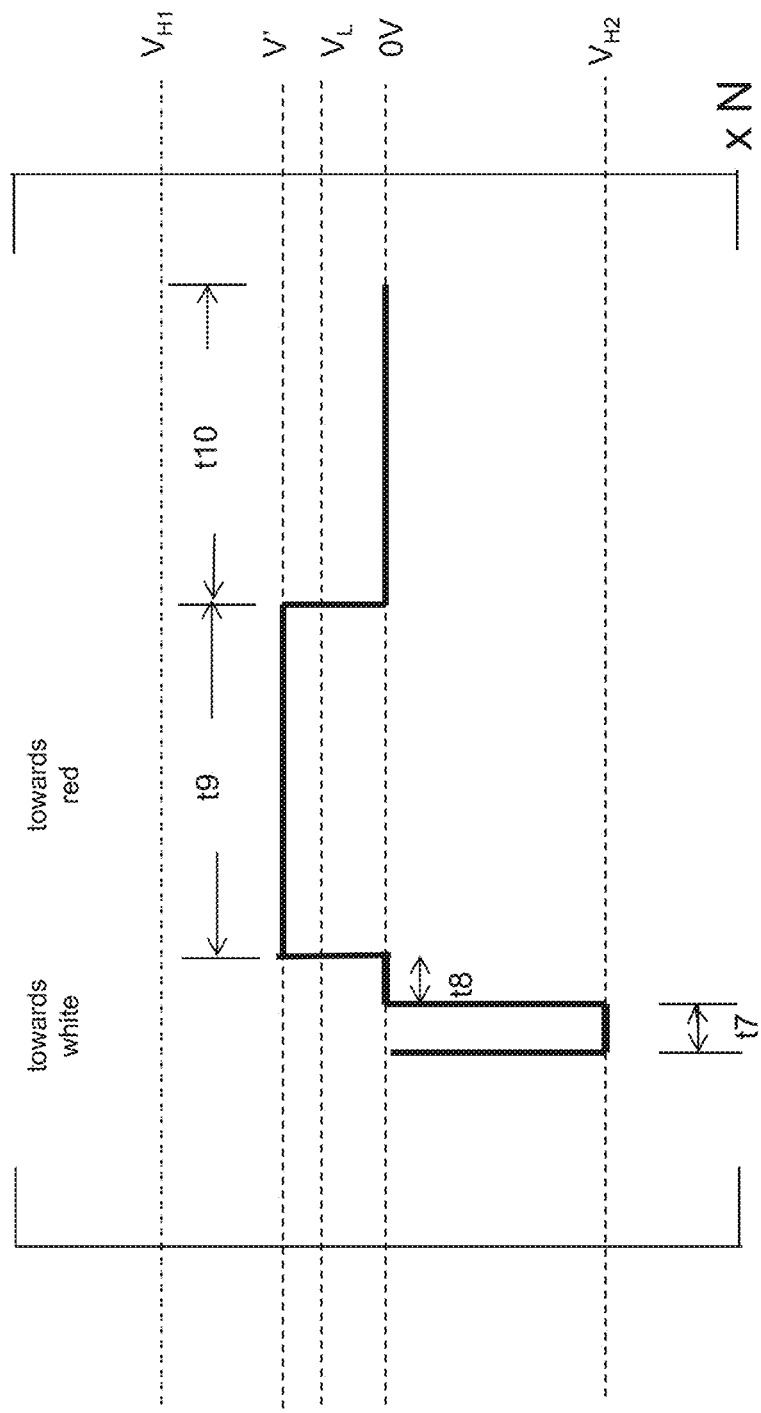
FIG. 11 illustrates a fourth driving method of the present invention.

The Fourth Driving Method:

The fourth driving method of the present invention is illustrated in FIG. 11. It relates to a driving waveform which may also be used to replace the driving period of t3 in FIG. 3.

In an initial step, a high negative driving voltage ($V_{H2}$, e.g., −15V) is applied to a pixel for a period of t7, which is followed by a wait time of t8. After the wait time, a positive driving voltage (V', e.g., less than 50% of $V_{H1}$ or $V_{H2}$) is applied to the pixel for a period of t9, which is followed by a second wait time of t10. The waveform of FIG. 11 is repeated N times. The term, "wait time", as described above, refers to a period of time in which no driving voltage is applied.

This driving method not only is particularly effective at a low temperature, it can also provide a display device better tolerance of structural variations caused during manufacture of the display device. Therefore its usefulness is not limited to low temperature driving.

In the waveform of FIG. 11, the first wait time t8 is very short while the second wait time t10 is longer. The period of t7 is also shorter than the period of t9. For example, t7 may be in the range of 20-200 msec; t8 may be less than 100 msec; t9 may be in the range of 100-200 msec; and t10 may be less than 1000 msec.

Figure 12:
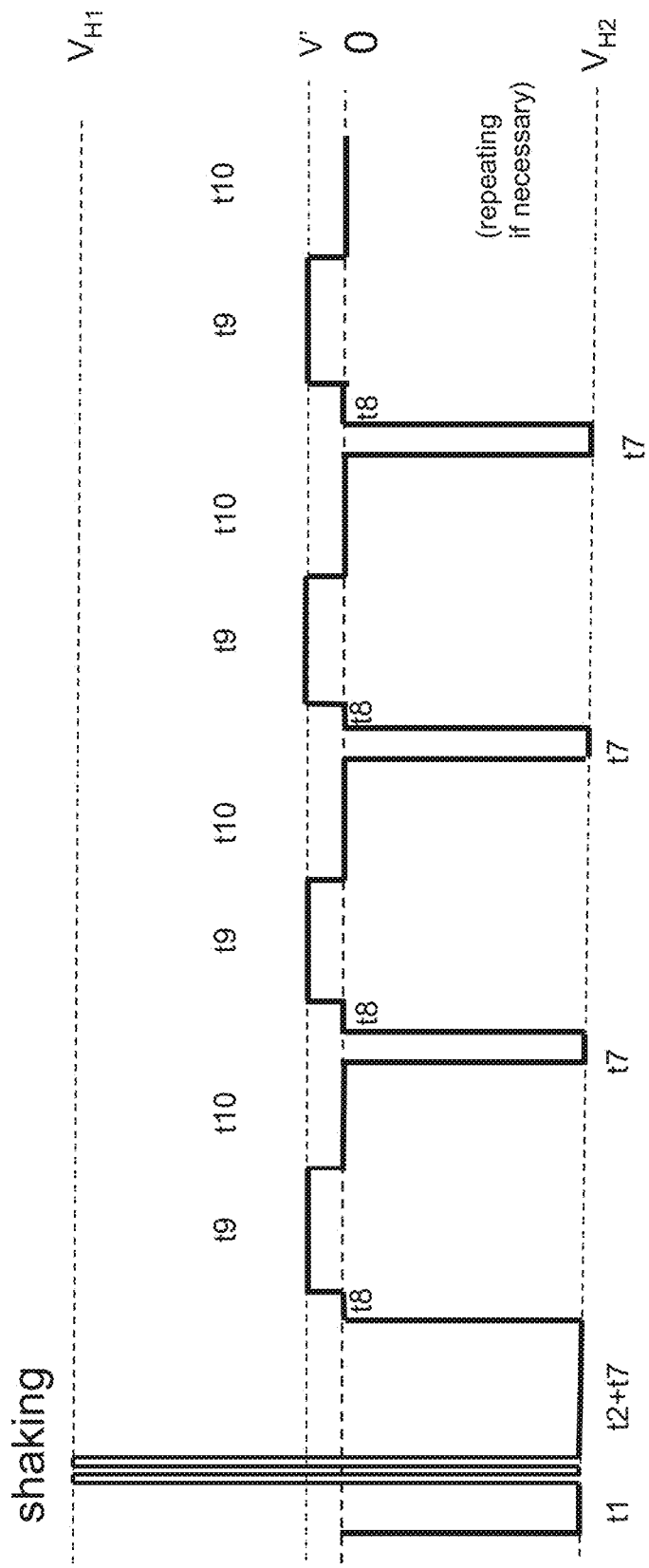
FIGS. 12 and 13 depict driving sequences utilizing the fourth driving method of the present invention.

FIG. 12 is a combination of FIG. 3 and FIG. 11. In FIG. 3, a white state is displayed during the period of t2. As a general rule, the better the white state in this period, the better the red state that will be displayed at the end.

In the shaking waveform, the positive/negative pulse pair is preferably repeated 50-1500 times and each pulse is preferably applied for 10 msec.

Figure 13:
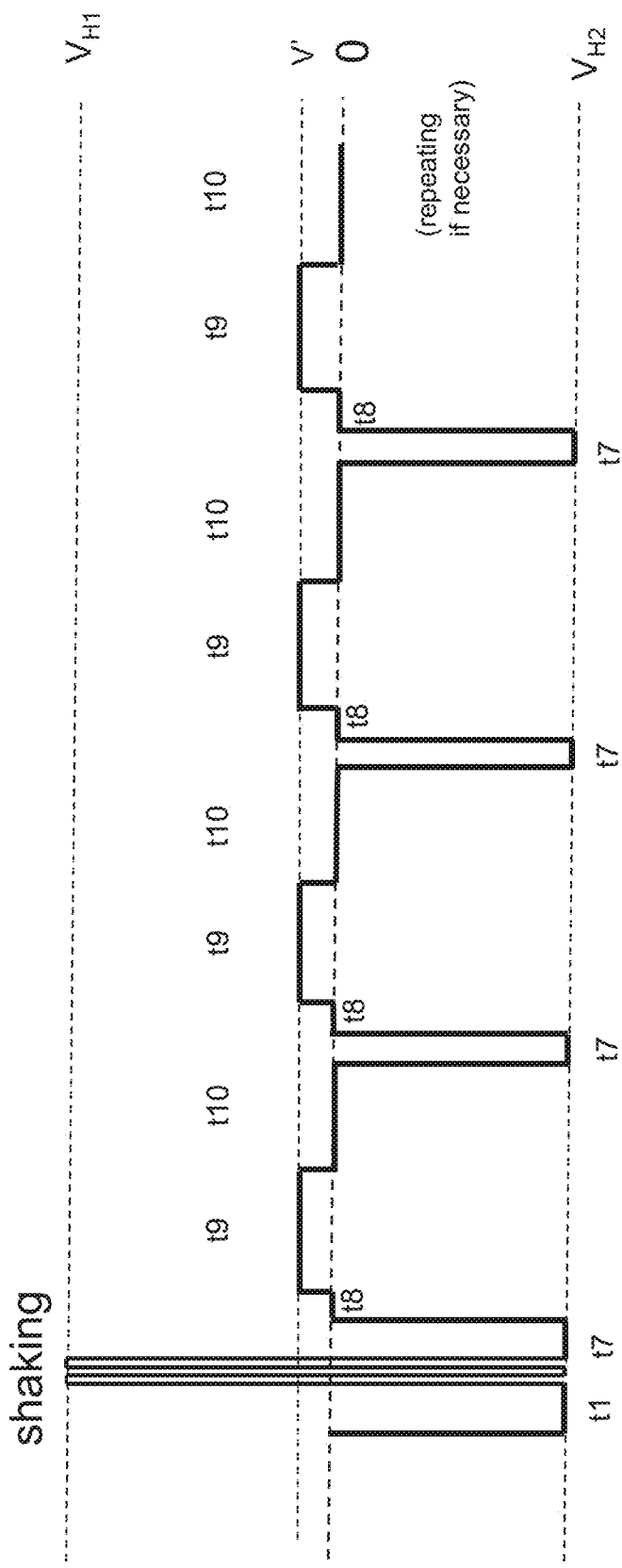

In one embodiment, the step of driving to the white state for a period of t2 may be eliminated and in this case, a shaking waveform is applied before applying the waveform of FIG. 11 (see FIG. 13).

The fourth driving method of FIG. 11 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
(a) the three types of pigment particles have optical characteristics differing from one another;
(b) the first type of pigment particles and the second type of pigment particles carry opposite charge polarities; and
(c) the third type of pigment particles has the same charge polarity as the second type of pigment particles but at a lower intensity, the method comprises the following steps:
(i) applying a first driving voltage to a pixel in the electrophoretic display for a first period of time, wherein the first driving voltage has the same polarity as the first type of pigment particles to drive the pixel towards the color state of the first type of pigment particles at the viewing side;
(ii) applying no driving voltage to the pixel for a second period of time;
(iii) applying a second driving voltage to the pixel for a third period of time, wherein the second driving voltage has same polarity as the third type of pigment particles to drive the pixel towards the color state of the third type of pigment particles at the viewing side;
(iv) applying no driving voltage to the pixel for a fourth period of time; and
repeating steps (i)-(iv).

In one embodiment, the first type of pigment particles is negatively charged and the second type of pigment particles is positively charged.

In one embodiment, steps (i)-(iv) are repeated at least 3 times.

In one embodiment, the second driving voltage is less than 50% of the driving voltage sufficient to drive a pixel from the color state of the first type of pigment particles to the color state of the second type of pigment particles, or vice versa.

In another embodiment, the driving sequence of FIG. 12 or FIG. 13 is DC balanced.

The Fifth Driving Method:

As shown in FIG. 2(a), because the black particles and the red particles carry the same charge polarity, they tend to move in the same direction. Even though the black particles move faster than the red particles under certain driving voltages because of their higher charge and possibly also smaller size, some of the red particles may still be driven to the viewing side with the black particles, to cause the quality of the black state to degrade.

Figure 14:
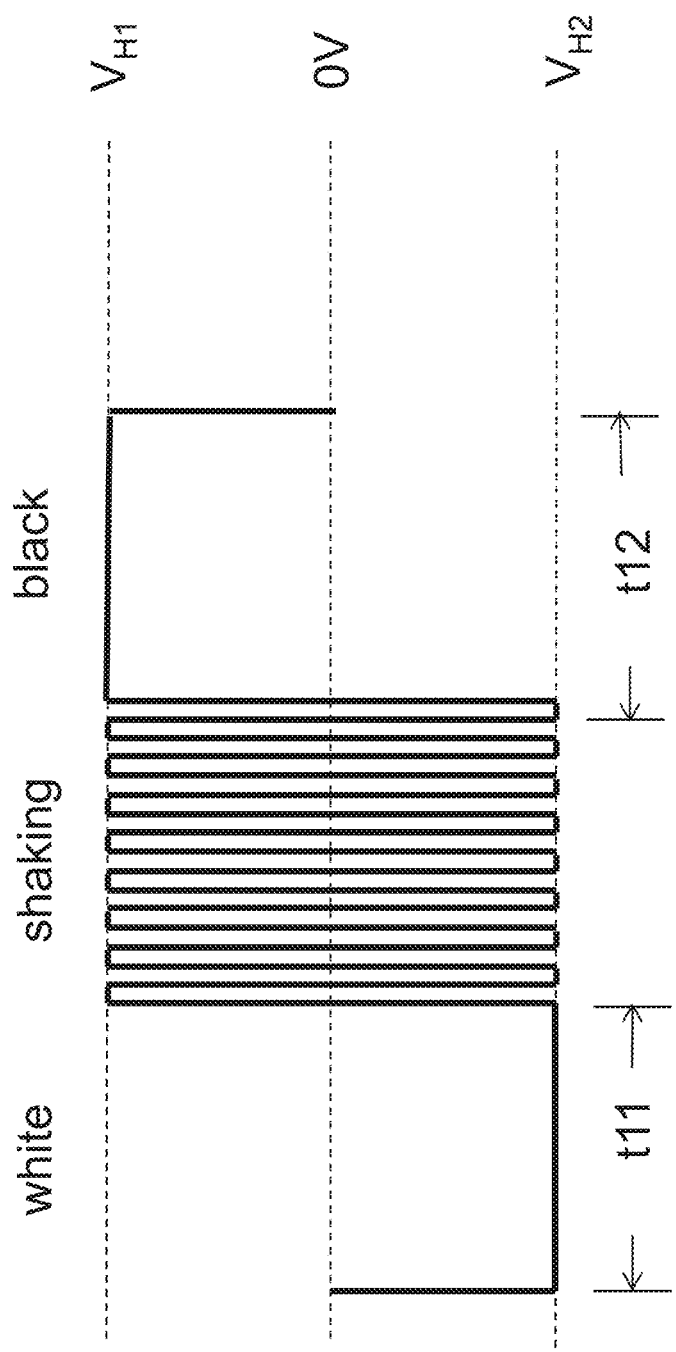
FIG. 14 depicts a typical waveform for driving a pixel to a black state in a color display device.

FIG. 14 depicts a typical waveform for driving a pixel towards the black state. A shaking waveform (explained above) is included to ensure color brightness and purity. As shown, a high positive driving voltage ($V_{H1}$, e.g., +15V) is applied for a period of t12 to drive a pixel towards a black state after the shaking waveform. A driving voltage is applied for a period of t11 before the shaking waveform to ensure DC balance.

Figure 15:
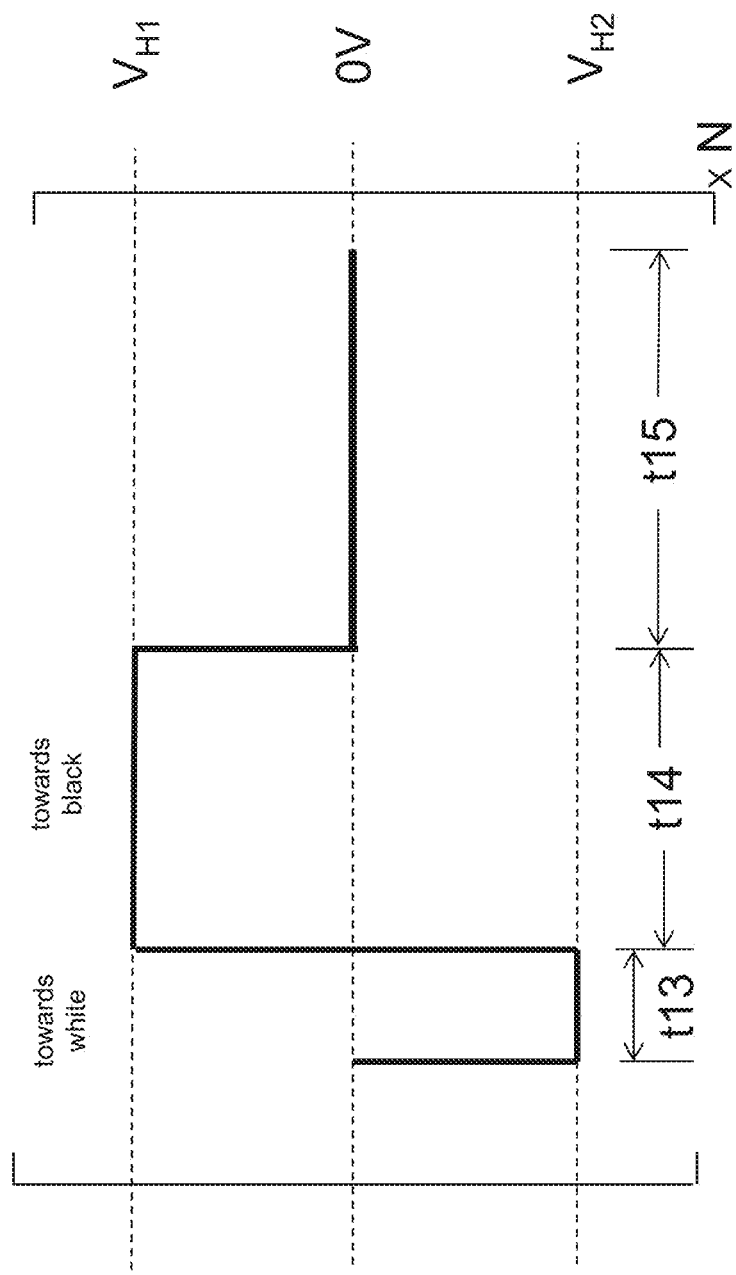
FIG. 15 illustrates a fifth driving method of the present invention.

The fifth driving method of the present invention is illustrated in FIG. 15. It relates to a driving waveform to be added at the end of the waveform of FIG. 14, for driving a pixel towards the black state. The combined waveform can further provide better separation of the black particles from the red particles, rendering the black state more saturated, with less red tinting.

In FIG. 15, a short pulse "t13" of $V_{H2}$ (negative) is applied, followed by a longer pulse "t14" of $V_{H1}$ (positive) and a wait time (0V) of t15. Such a sequence is applied for at least once, preferably at least 3 times (i.e., N is ≥3) and more preferably at least five to seven times.

The pulse "t14" is usually at least twice the length of the pulse "t13".

The short pulse "t13" of $V_{H2}$ will push the black and red particles towards the pixel electrode and the longer pulse "t14" of $V_{H1}$ will push them to the common electrode side (i.e., the viewing side). Since the speed of the two types of pigment particles are not the same under the same driving voltages, this asymmetrical driving sequence will benefit the black particles more than the red particles. As a result, the black particles can be better separated from the red particles.

The wait time "t15" is optional, depending on the dielectric layers in the display device. It is common that at a lower temperature, the resistance of the dielectric layers is more pronounced and, in this case, a wait time may be needed to release the charge trapped in the dielectric layers.

The fifth driving method of FIG. 15 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
the method comprises the following steps:
  (i) applying a first driving voltage to a pixel in the electrophoretic display for a first period of time, wherein the first driving voltage has the same polarity as the first type of pigment particles to drive the pixel towards the color state of the first type of pigment particles at the viewing side;
  (ii) applying a second driving voltage to the pixel for a second period of time, wherein the second driving voltage has the same polarity as the second type of pigment particles to drive the pixel towards the color state of the second type of pigment particles at the viewing side;
  (iii) optionally applying no driving voltage to the pixel for a third period of time; and
repeating steps (i), (ii) and (iii) if present.

In one embodiment, the first type of pigment particles is negatively charged and the second type of pigment particles is positively charged.

Figure 16:
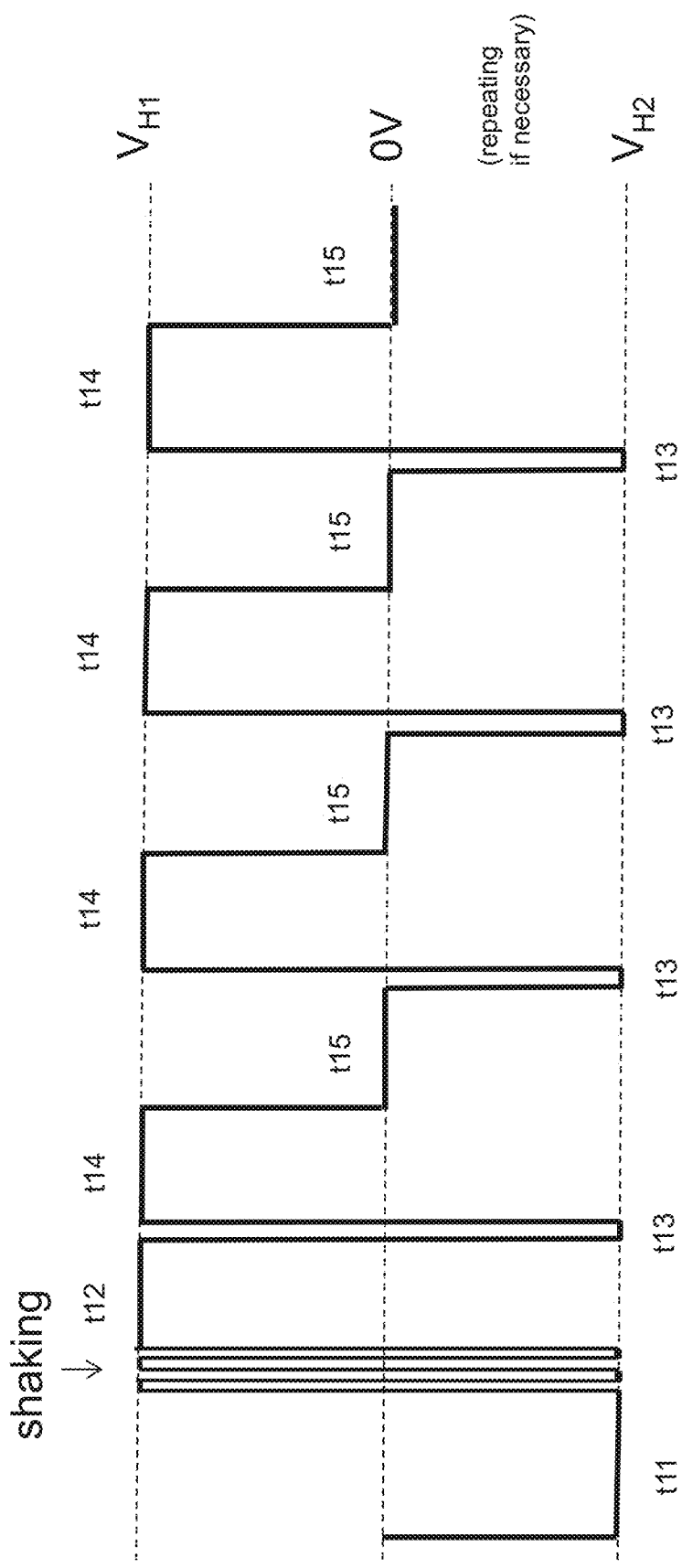
FIG. 16 depicts a driving sequence utilizing the fifth driving method of the present invention.

FIG. 16 shows the sequence combining the waveform of FIG. 14 and the waveform of FIG. 15. However it is also noted that, depending on the particle speed and the cycle number (N) of the sequence, "t12" may be shortened. In other words, at the end of "t12", the pixel does not have to be at the full black state. Instead, the waveform of FIG. 15 could start at any state from black to white, including grey, provided that the number (N) in the sequence is sufficient to drive the pixel to the black state at the end.

The method as described in FIGS. 14-16 may also be utilized to drive a pixel to the black state at a low temperature. In this case, the period t14 must be longer than t13 and the wait time t15 has to be at least 50 msec.

In one embodiment, the driving sequence of FIG. 16 is DC balanced.

The Sixth Driving Method:
FIG. 17 depicts a typical waveform for driving a pixel to a white state. A shaking waveform (explained above) is included to ensure color brightness and purity. A driving voltage of $V_{H2}$ is applied for a period of t17 after the shaking waveform. A driving voltage is applied for a period of t16 before the shaking waveform to ensure DC balance.

The sixth driving method of the present invention is illustrated in FIGS. 18(a) and 18(b). It relates to waveforms to replace t17 in the waveform of FIG. 17.

This driving method is particularly suitable for low temperature driving, although it is not limited to low temperature driving.

In FIG. 18(a), a short pulse "t18" of $V_{H1}$ (positive) is applied, followed by a longer pulse "t19" of $V_{H2}$ (negative) and a wait time (0V) of t20. As shown in FIG. 18(b), the amplitude of the negative driving voltage (V") applied during t19 may be higher than that of $V_{H2}$ (e.g., −30V instead of −15V).

Such a sequence is applied for at least once, preferably at least 3 times (i.e., N is ≥3 in FIGS. 18(a) and 18(b), and more preferably at least five to seven times.

It is noted that the t19 must be longer than t18. For example, t18 may be in the range of 20-200 msec and t19 may be less than 1000 msec. The wait time t20 needs to be at least 50 msec.

The sixth driving method as shown in FIGS. 18(a) and 18(b) may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
  (a) the three types of pigment particles have optical characteristics differing from one another;
  (b) the first type of pigment particles and the second type of pigment particles carry opposite charge polarities; and
  (c) the third type of pigment particles has the same charge polarity as the second type of pigment particles but at a lower intensity,
the method comprises the following steps:
  (i) applying a first driving voltage to a pixel in the electrophoretic display for a first period of time, wherein the first driving voltage has the same polarity as the second type of pigment particles to drive the pixel towards the color state of the second type of pigment particles at the viewing side;
  (ii) applying a second driving voltage to the pixel for a second period of time, wherein the second driving voltage has the same polarity as the first type of pigment particles to drive the pixel towards the color state of the first type of pigment particles at the viewing side;
  (iii) applying no driving voltage to the pixel for a third period of time; and
repeating steps (i) and (ii).

In one embodiment, the first type of pigment particles is negatively charged and the second type of pigment particles is positively charged.

In one embodiment as shown in FIG. 18(a), the second voltage is the driving voltage required to drive a pixel from the color state of the first type of pigment particles towards the color state of the second type of pigment particles, or vice versa.

In another embodiment as shown in FIG. 18(b), the second voltage has a amplitude higher than that of the driving voltage required to drive a pixel from the color state of the first type of pigment particles towards the color state of the second type of pigment particles, or vice versa.

Figure 19A:
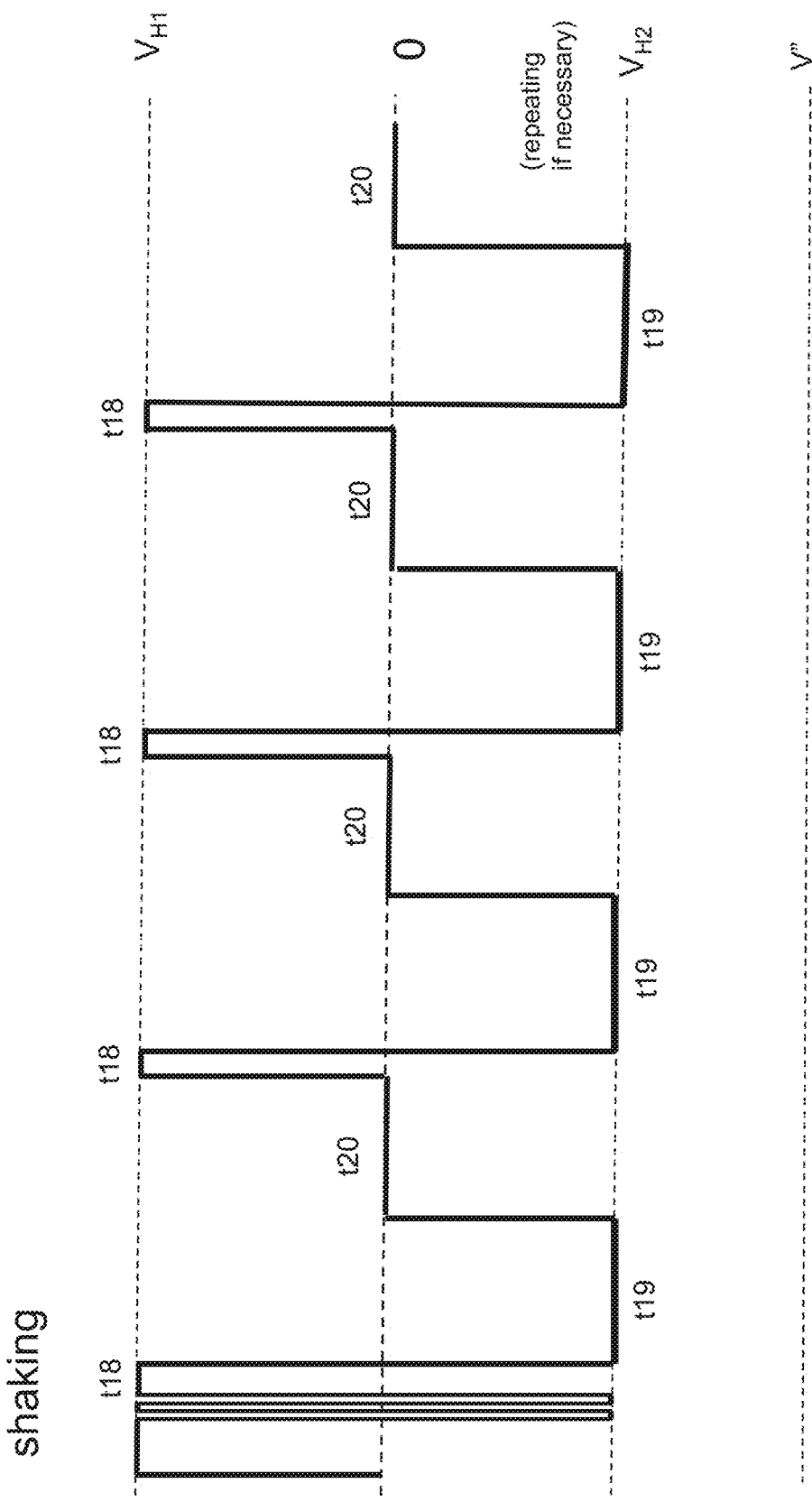

FIGS. 19a and 19b show sequences where t17 in FIG. 17 is replaced with a waveform of FIGS. 18(a) and 18(b), respectively.

In the shaking waveform, the positive/negative pulse pair is preferably repeated 50-1500 times and each pulse is preferably applied for 10 msec.

In one embodiment, the driving sequence of FIG. 19a or FIG. 19b is DC balanced.

The Seventh Driving Method:
The seventh driving method of the present invention drives a pixel towards an intermediate color state (e.g., grey).

Figure 20:
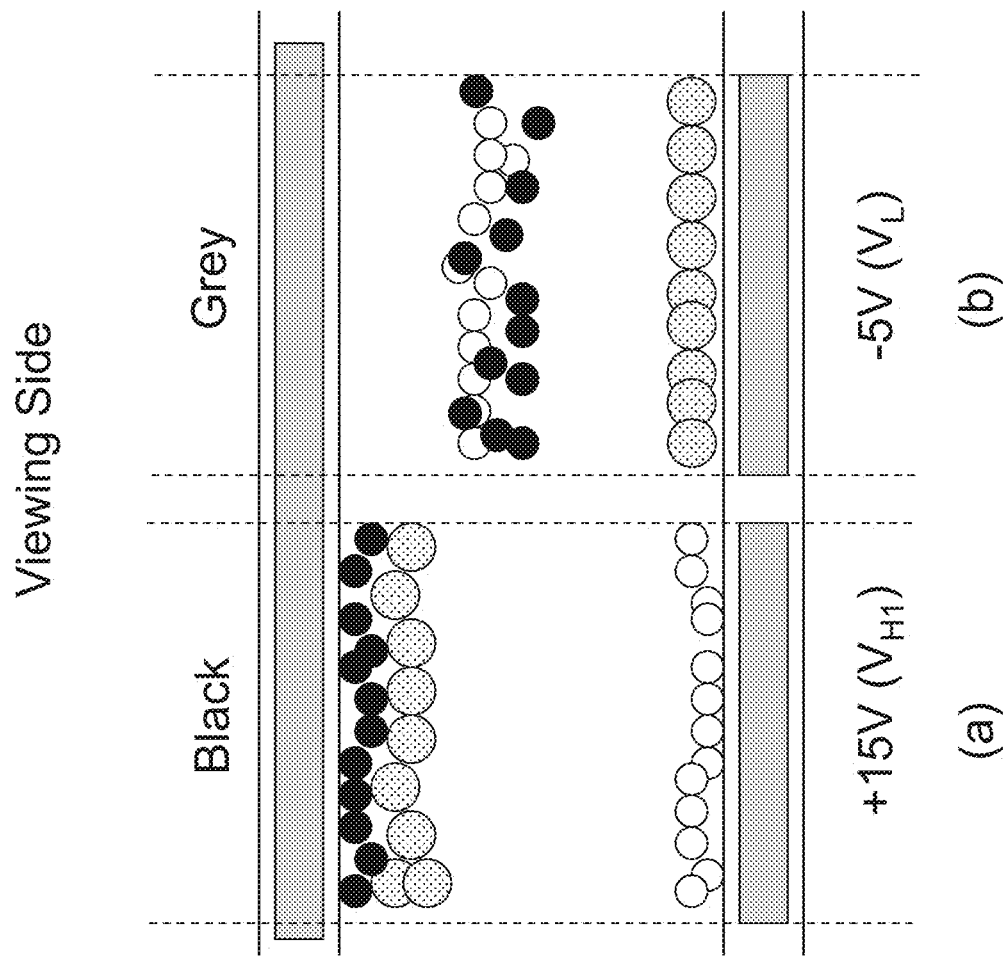
FIG. 20 a diagram depicting another example of driving scheme.

FIG. 20 illustrates the driving scheme. As shown, a pixel in the black state (see FIG. 20a) is driven towards a grey state when a low negative driving voltage ($V_L$, e.g., −5V) is applied. In the process, the low driving voltage pushes the red particles towards the side of the pixel electrode and a mixture of black and white particles is seen at the viewing side.

Figure 21:
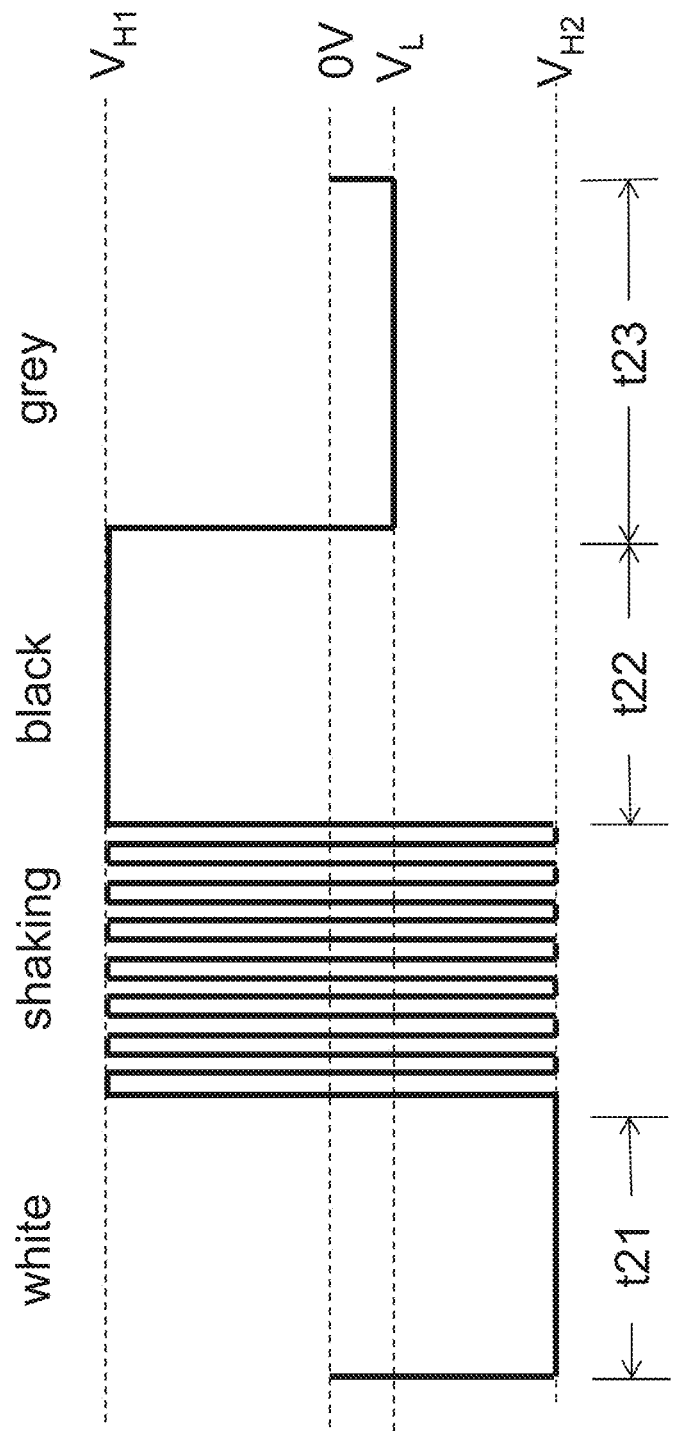
FIG. 21 illustrates a typical waveform for driving a pixel to an intermediate color state in a color display device.

This driving method is shown in FIG. 21. A high positive driving voltage ($V_{H1}$, e.g., +15V) is applied for a time period of t22 to drive a pixel towards a black state, after a shaking waveform. From the black state, the pixel may be driven towards the grey state by applying a low negative driving voltage ($V_L$, e.g., −5V) for a period of t23, that is, driven from FIG. 20(a) to FIG. 20(b).

The driving period t22 is a time period sufficient to drive a pixel to the black state when $V_{H1}$ is applied, and t23 is a time period sufficient to drive the pixel to the grey state from the black state when $V_L$ is applied. Prior to the shaking waveform, a pulse of $V_{H1}$ is preferably applied for a period of t21 to ensure DC balance.

Figure 22:
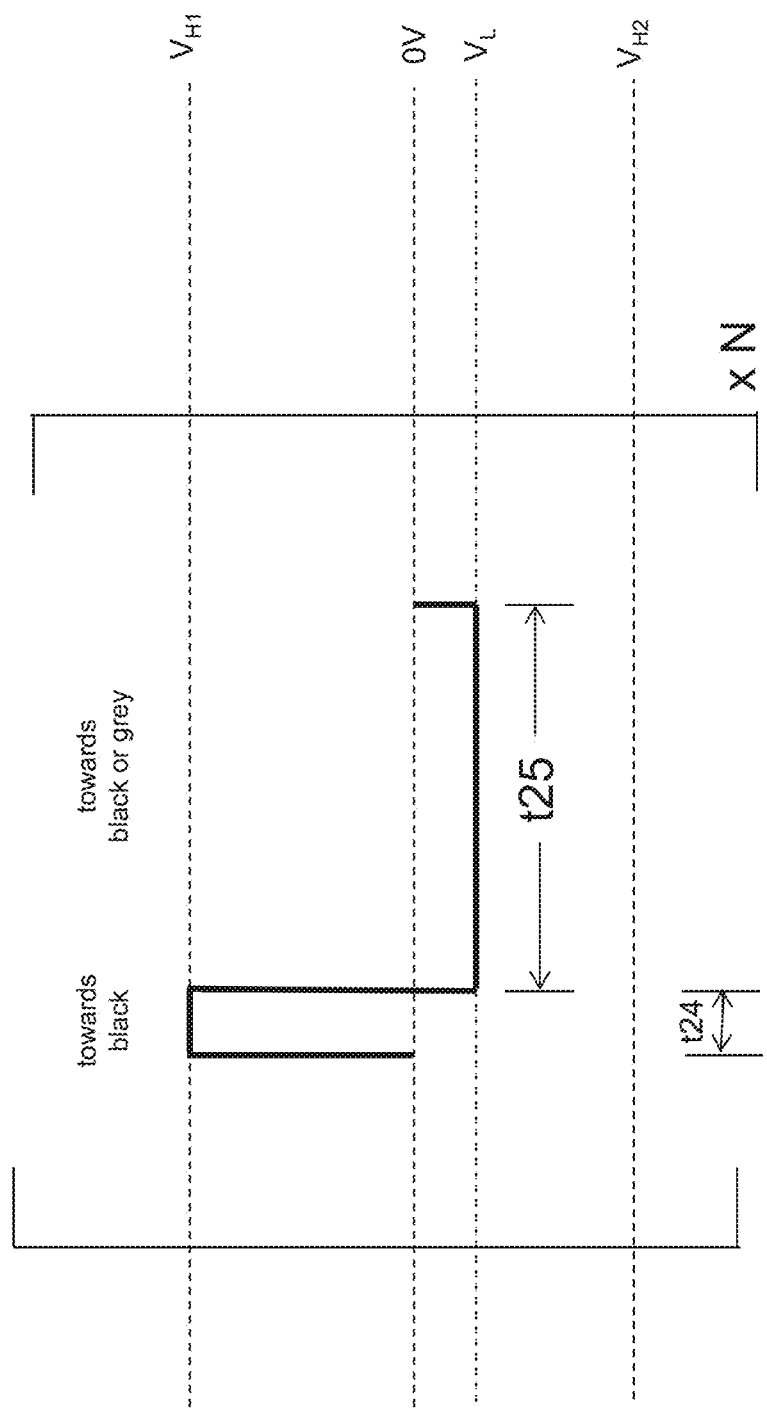
FIG. 22 illustrates a seventh driving method of the present invention.

FIG. 22 relates to a driving waveform which may be used to replace the driving period of t23 in FIG. 21. In an initial step, a high positive driving voltage ($V_{H1}$, e.g., +15V) is applied for a short period of t24 to push the black particles towards the viewing side, but t24 is not sufficient to drive the pixel to the full black state, which is followed by applying a low negative driving voltage ($V_L$, e.g., −5V) for a period of t25 to drive the pixel towards a grey state. The amplitude of $V_L$ is less than 50% of $V_H$ (e.g., $V_{H1}$ or $V_{H2}$).

The waveform of FIG. 22 is repeated for at least 4 cycles (N≥4), preferably at least 8 cycles.

The time period, t24 is less than about 100 msec and t25 is usually greater than 100 msec, both at ambient temperature.

The seventh driving method as shown in FIG. 22 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
 (a) the three types of pigment particles have optical characteristics differing from one another;
 (b) the first type of pigment particles and the second type of pigment particles carry opposite charge polarities; and
 (c) the third type of pigment particles has the same charge polarity as the second type of pigment particles but at a lower intensity,
which method comprises the following steps:
 (i) applying a first driving voltage to a pixel in the electrophoretic display for a first period of time, which first driving voltage has the same polarity as the second type of pigment particles to drive the pixel towards the color state of the second type of pigment particles wherein the first period of time is not sufficient to drive the pixel to the full color state of the second type of pigment particles at the viewing side;
 (ii) applying a second driving voltage to the pixel for a second period of time, which second driving voltage has the same polarity as the first type of pigment particles to drive the pixel towards a mixed state of the first and second types of pigment particles at the viewing side; and
repeating steps (i) and (ii).

As stated above, the second driving voltage is about 50% of the first driving voltage, in this method.

Figure 23:
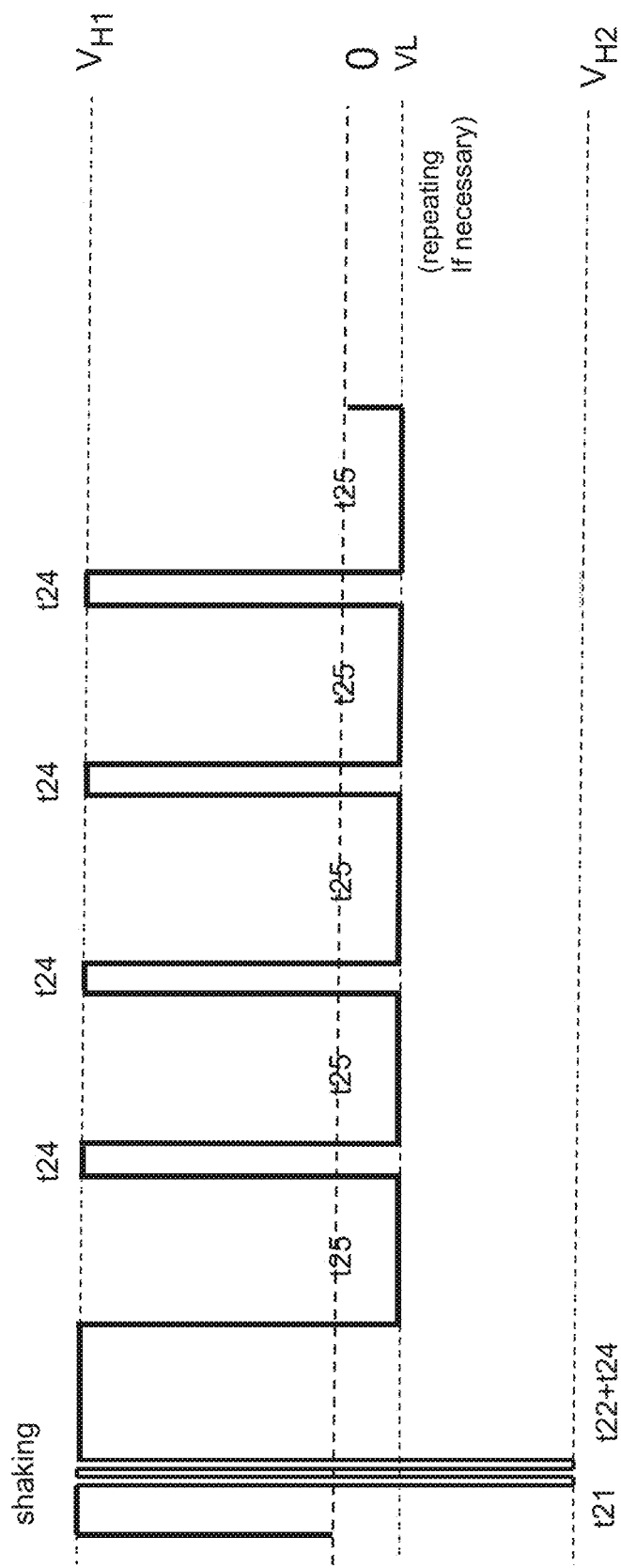
FIG. 23 depicts a driving sequence utilizing the seventh driving method of the present invention.

FIG. 23 shows the combination of the waveform of FIG. 21 and the waveform of FIG. 22, in which the driving period of t23 is replaced with FIG. 22. In other words, the driving method may consist of four phases. The first phase is the DC balance phase (t21); the second phase is a shaking step; and the third phase is driving a pixel to the black state (t22). In the third phase, the waveform can be any waveform as long as it drives a pixel to a good black state. The fourth phase consists of a high positive driving voltage for a short period of time, followed by a low negative driving voltage for a longer period of time. The fourth phase, as stated, is repeated several times.

It is noted that in FIG. 23, t22 may be optional.

It is possible to modulate the grey state to be brighter or darker by changing the low negative voltage ($V_L$). In other words, the waveform sequence and shape may remain the same; but the amplitude of $V_L$ varies (e.g. −4V, −5V, −6V or −7V) to cause different grey levels to be displayed. This feature could potentially reduce the required space for the look-up tables in the driving circuit, consequently lowering the cost. The driving method as illustrated can produce a high quality of an intermediate state (of the first type of pigment particles and the second type of pigment particles) with very little color interference from the third type of pigment particles.

In one embodiment, the driving sequence of FIG. 23 is DC balanced.

Figure 24:
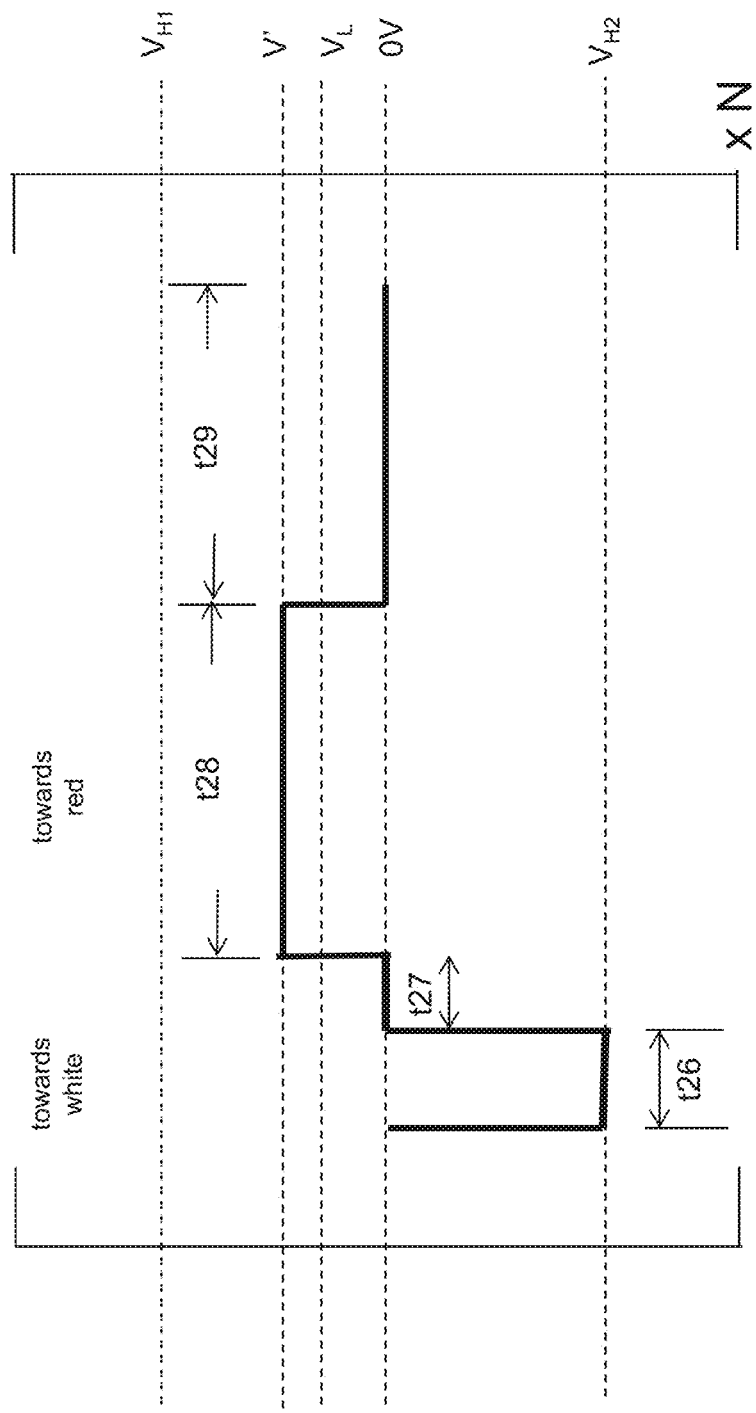
FIG. 24 illustrates an eighth driving method of the present invention.

The Eighth Driving Method:

The eighth driving method of the present invention is illustrated in FIG. 24. It is intended to be applied to a pixel which is not at a white state (i.e., the color state of the first type of pigment particles).

In an initial step, a high negative driving voltage ($V_{H2}$, e.g., −15V) is applied for a period of t26, which is followed by a wait time of t27. After the wait time, a positive 25 driving voltage (V', e.g., less than 50% of $V_{H1}$ or $V_{H2}$) is applied for a period of t28, which is followed by a second wait time of t29. The waveform of FIG. 24 is repeated N times. The term, "wait time", as described above, refers to a period of time in which no driving voltage is applied.

This driving method is particularly effective at a low temperature, and it may also shorten the overall driving time to the red state.

It is noted that the time period t26 is rather short, usually in the range of about 50% of the time required to drive from a full black state to a full white state and therefore it is not sufficient to drive a pixel to a full white color state. The time period t27 may be less than 100 msec; the time period t28 may range of 100-200 msec; and the time period t29 may be less than 1000 msec.

It is also noted that the waveform of FIG. 24 is similar to that of FIG. 11, except that the waveform of FIG. 11 is disclosed to be applied to a pixel which is in a white state (i.e., the color of the first type of pigment particles) whereas the waveform of FIG. 24 is intended to be applied to a pixel which is not in a white state.

Figure 25:
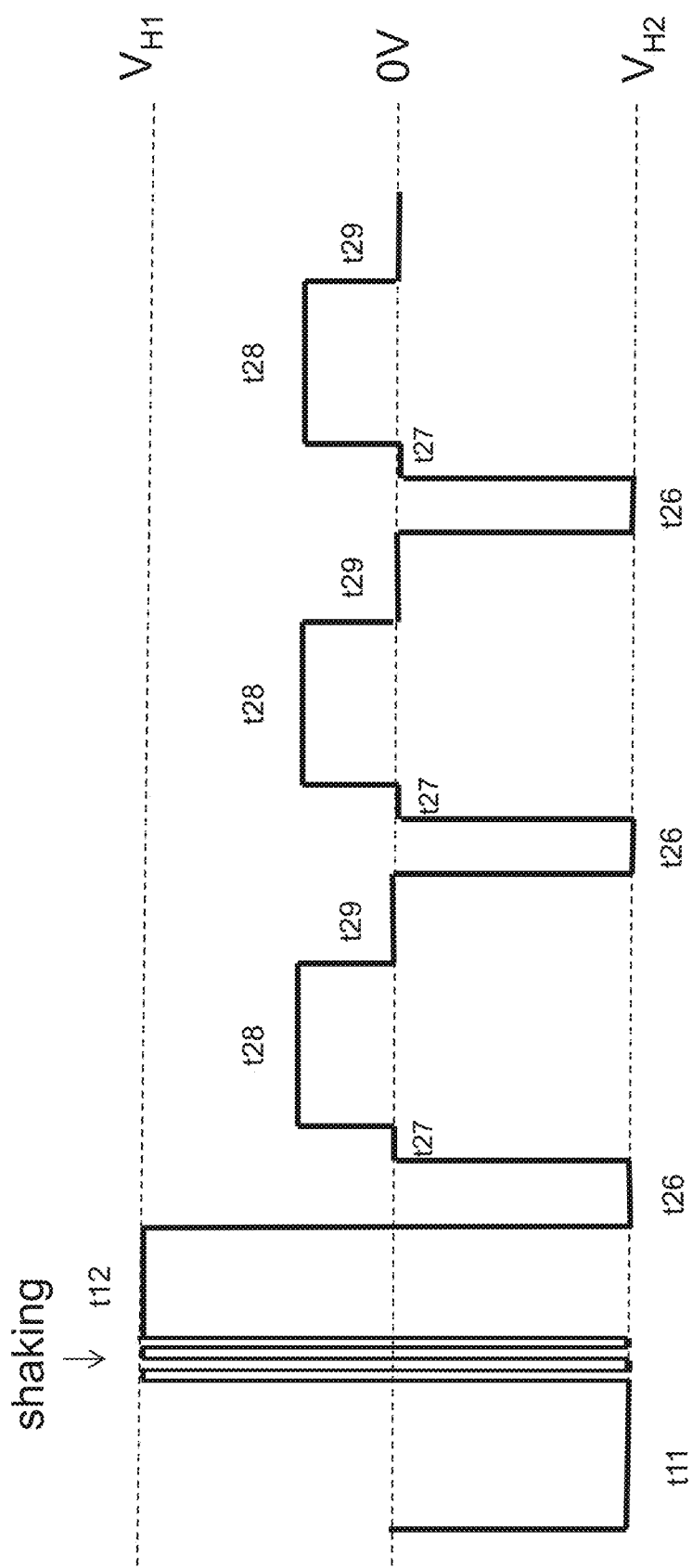
FIG. 25 illustrates a driving sequence utilizing the eighth driving method of the present invention.

FIG. 25 is an example wherein the waveform of FIG. 24 is applied to a pixel which is at a black state (i.e., the color state of the second type of pigment particles).

In the shaking waveform, the positive/negative pulse pair is preferably repeated 50-1500 times and each pulse is preferably applied for 10 msec.

The eighth driving method of FIG. 24, like that of FIG. 11, may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
- (a) the three types of pigment particles have optical characteristics differing from one another;
- (b) the first type of pigment particles and the second type of pigment particles carry opposite charge polarities; and
- (c) the third type of pigment particles has the same charge polarity as the second type of pigment particles but at a lower intensity, the method comprises the following steps:
- (i) applying a first driving voltage to a pixel in the electrophoretic display for a first period of time, wherein the first driving voltage has the same polarity as the first type of pigment particles to drive the pixel towards the color state of the first type of pigment particles at the viewing side;
- (ii) applying no driving voltage to the pixel for a second period of time;
- (iii) applying a second driving voltage to the pixel for a third period of time, wherein the second driving voltage has same polarity as the third type of pigment particles to drive the pixel towards the color state of the third type of pigment particles at the viewing side;
- (iv) applying no driving voltage to the pixel for a fourth period of time; and repeating steps (i)-(iv).

In one embodiment, the first type of pigment particles is negatively charged and the second type of pigment particles is positively charged.

In one embodiment, steps (i)-(iv) are repeated at least 3 times.

In one embodiment, the second driving voltage is less than 50% of the driving voltage sufficient to drive a pixel from the color state of the first type of pigment particles to the color state of the second type of pigment particles, or vice versa.

In one embodiment, the driving sequence of FIG. 25 is DC balanced.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A driving method for an electrophoretic display comprising a first surface on the viewing side, a second surface on the non-viewing side and an electrophoretic fluid which fluid is sandwiched between a common electrode and a layer of pixel electrodes and comprises a first type of pigment particles, a second type of pigment particles and a third type of pigment particles, all of which are dispersed in a solvent or solvent mixture, wherein
- (a) the three types of pigment particles have optical characteristics differing from one another;
- (b) the first type of pigment particles and the second type of pigment particles carry opposite charge polarities; and
- (c) the third type of pigment particles has the same charge polarity as the second type of pigment particles but at a lower intensity, which method comprises the following steps:
- (i) applying a first driving voltage to a pixel in the electrophoretic display for a first period of time, wherein the first driving voltage has a first direction that drives the second type of pigment particles toward the viewing side of the electrophoretic display, wherein the first period of time is not sufficient to drive the pixel to the full color state of the second type of pigment particles at the viewing side;
- (ii) applying a second driving voltage to the pixel for a second period of time, wherein the second driving voltage has a second direction that drives the first type of pigment particles toward the viewing side of the electrophoretic display, wherein the second period of time is not sufficient to drive the pixel to the full color state of the first type of pigment particles at the viewing side; and repeating a driving cycle including steps (i) and (ii) for a plurality of times until a color state of a mixture of the first and second types of pigment particles appears at the viewing side.

2. The method of claim 1, wherein the first type of pigment particles is negatively charged and the second type of pigment particles is positively charged.

3. The method of claim 1, wherein the amplitude of the first driving voltage and the amplitude of the second driving voltage are not the same.

4. The method of claim 3, wherein the magnitude of the second driving voltage is less than 50% of the magnitude of the first driving voltage.

5. The method of claim 1, wherein steps (i) and (ii) are repeated at least 4 times.

6. The method of claim 1, further comprising a shaking waveform before step (i).

7. The method of claim 6, further comprising a driving step to the full color state of the first type of pigment particles before the shaking waveform.

8. The method of claim 1, wherein the color state of a mixture of the first and second types of pigment particles comprises equal amounts of first and second types of pigment particles.

9. The method of claim 1, wherein the color state of a mixture of the first and second types of pigment particles comprises more first type of pigment particles than second type of pigment particles.

10. The method of claim 1, wherein the color state of a mixture of the first and second types of pigment particles comprises less first type of pigment particles than second type of pigment particles.

11. The method of claim 1, further comprising a DC balance pulse.

* * * * *